(12) United States Patent
Streetman et al.

(10) Patent No.: US 6,478,434 B1
(45) Date of Patent: Nov. 12, 2002

(54) CRYO MICROPOSITIONER

(75) Inventors: Scott A. Streetman, Boulder, CO (US); Lana Kingsbury, Boulder, CO (US)

(73) Assignee: Ball Aerospace & Technologies Corp., Boulder, CO (US)

(*) Notice: Subject to any disclaimer, the term of this patent is extended or adjusted under 35 U.S.C. 154(b) by 0 days.

(21) Appl. No.: 09/437,289

(22) Filed: Nov. 9, 1999

(51) Int. Cl.[7] .............................................. G02B 7/182
(52) U.S. Cl. ................. 359/872; 318/592; 318/568.17; 74/89.23
(58) Field of Search ......................... 74/89.23; 248/548, 248/560, 614, 564, 466, 475.1, 476, 481, 482, 487, 488; 343/757, 761, 765, 766, 878; 359/872, 846, 849, 224, 900; 318/592, 568.17

(56) References Cited

U.S. PATENT DOCUMENTS

| | | | |
|---|---|---|---|
| 2,681,991 A | 6/1954 | Marco et al. ............ 250/33.65 |
| 2,772,572 A | 12/1956 | Siler et al. ...................... 74/86 |
| 2,994,877 A | 8/1961 | De Mott et al. ............ 343/912 |
| 3,125,888 A | 3/1964 | Fox et al. ........................ 74/98 |
| 3,386,694 A | 6/1968 | Boyle ............................ 248/179 |
| 3,527,435 A | 9/1970 | Lapp et al. ................. 248/184 |
| 4,060,315 A | 11/1977 | Heinz ........................... 350/289 |
| 4,199,762 A | 4/1980 | Estlick et al. ............... 343/765 |
| 4,373,404 A * | 2/1983 | Heinz ...................... 74/424.88 |
| 4,491,847 A | 1/1985 | Estang ........................ 343/765 |
| 4,533,100 A | 8/1985 | Paseri ........................... 244/158 |
| 4,574,659 A | 3/1986 | Arndt ............................. 74/804 |
| 4,636,800 A | 1/1987 | Kasiwade ................... 343/766 |
| 4,691,207 A | 9/1987 | Timineri ..................... 343/766 |
| 4,786,912 A | 11/1988 | Brown et al. ............... 343/761 |
| 5,004,205 A | 4/1991 | Brown et al. ............... 248/476 |
| 5,339,708 A | 8/1994 | Nakamura ..................... 74/665 |
| 5,396,815 A | 3/1995 | Polites et al. .................. 74/61 |
| 5,473,335 A | 12/1995 | Tines .......................... 343/766 |
| 5,528,959 A | 6/1996 | Yamakami .................... 74/665 |
| 5,550,669 A | 8/1996 | Patel .......................... 359/224 |
| 5,560,256 A | 10/1996 | Tines .......................... 74/490 |
| 5,579,018 A | 11/1996 | Francis et al. .............. 343/757 |
| 5,633,647 A | 5/1997 | Tines .......................... 343/766 |
| 5,642,237 A | 6/1997 | Miyawaki et al. .......... 359/849 |
| 5,673,057 A | 9/1997 | Toland et al. ............... 343/761 |
| 5,769,748 A | 6/1998 | Eyerly et al. ................... 475/5 |
| 5,783,899 A * | 7/1998 | Okazaki ...................... 310/317 |
| 5,864,320 A | 1/1999 | Baghdasarian ............. 343/757 |
| 5,969,892 A | 10/1999 | Slusher ...................... 359/872 |
| 6,242,910 B1 * | 6/2001 | Guzik et al. ................ 324/212 |

FOREIGN PATENT DOCUMENTS

WO     WO 99/26092     5/1999

\* cited by examiner

*Primary Examiner*—Cassandra Spyrou
*Assistant Examiner*—Euncha Cherry
(74) *Attorney, Agent, or Firm*—Sheridan Ross P.C.

(57) ABSTRACT

An actuator is configured to reliably provide fine and coarse positioning or adjusting for objects such as a telescope or other technical or scientific instrument or communication components, preferably at cryogenic as well as higher temperatures. The actuator includes a fine positioning system and a selectively engageable coarse positioning system. The fine positioning system includes a flexure structure constructed to provide support and strength, preferably in all axes, such as may be needed to withstand launch forces. Preferably flexure axes are defined at upper and lower edges of sidewalls and at intermediate positions of sidewalls. A cam or other suitable device adjusts distance between sidewall intermediate flexures and, by operation of sidewall flexures, adjusts the distance between upper and lower surfaces. A coupling is used to engage or disengage the coarse positioning system from a motor that is also connected to the fine positioning system so that the fine positioning system can perform fine positive or negative adjustments to the coarse position.

15 Claims, 19 Drawing Sheets

CRYO MICROPOSITIONER

Cross reference is made to U.S. patent application Ser. No. 08/879,740, U.S. Pat. No. 5,898,529, for a deployable space-based telescope filed Jun. 29, 1997, and Ser. No. 08/971,399, U.S. Pat. No. 5,969,892, for a motion reducing flexure structure filed Nov. 14, 1997, both of which are commonly assigned herewith and incorporated herein by reference.

The present invention is directed to an actuator of a type usable for making positional adjustments in technical or scientific instruments including interferometers and space-based or other telescopes.

BACKGROUND OF THE INVENTION

In a number of situations, it is useful to make both coarse and very fine changes or adjustments in position such as by an actuator. One area in which such positional adjustments may be useful is for adjustment, calibration, pointing, focusing and the like, of various technical or scientific instruments including interferometers and telescopes, particularly space-based telescopes and wireless communications components, e.g., antennas and other types of signal receptors. In the case of telescopes, the fineness or precision with which mirrors, mirror segments or other optical components must be positioned may be substantially finer than the step size with which an actuator, in a particular application, may be moved. Although actuators are of various types and are available with a variety of step sizes or precisions, there are often other constraints limiting the types of actuators available, including constraints on the size, weight, cost, suitable environment, or other performance characteristics of an actuator. Accordingly, in many situations, it is desired to use an actuator which has movement components or steps of a given minimum size but to achieve positioning of a telescope mirror segment or other optic with a precision which is finer than that of the actuator. These problems can be particularly acute in the case of a space-based telescope because of the tight constraints which weight and reliability place on actuator components. Accordingly, it would be useful to provide an actuator suitable for technical or scientific instruments, preferably suitable for a space-based telescope or other instruments.

In some actuators, the degree of fineness of adjustment is achieved at the price of an unacceptable reduction in the range of motion of the device. In some devices it was difficult or impossible to provide for the necessary coarse adjustment in addition to the necessary fine adjustment. Accordingly, it would be useful to provide an actuator which provides a relatively fine adjustment throughout a relatively large range of motion, preferably with a substantially predictable reduction ratio, and/or which allows for coarse adjustment as well as fine adjustment of position.

In space vehicles, size, weight, and power limitations are of paramount importance. For example, scientific or technical instruments and related components, such as actuators, on board such vehicles typically must have a low mass, small size, and low power consumption. In particular, actuators often must be capable of carrying heavy loads (i.e., have high strengths) due to the severe stresses caused by the vehicle velocities and accelerations and vibrations experienced during launch and/or orbit of the vehicle around a celestial body. Accordingly, there is a need for an actuator that is capable of providing all of the capabilities necessary (e.g., broad positioning range and resolution, low mass, small size, high degree of stiffness, high load capability, wide operating temperature range, low power consumption, etc.) for the positioning applications required by today's market but at a reasonable cost.

SUMMARY OF THE INVENTION

According to a first aspect of the present invention, a reduction device or fine positioning system is provided that provides at least certain motions using flexures. In one embodiment, left and right sidewalls are provided with intermediate flexures allowing them to be configured in a slightly angular or "V" shaped fashion, e.g. by moving the flexures of the left and right sidewalls farther apart or closer together. The upper and lower edges of the left and right side walls are joined, preferably also by flexures, to upper and lower walls which move together or apart as the sidewall intermediate flexures are moved farther apart or closer together. In one embodiment the distance between the sidewall intermediate flexures is adjusted by deflecting a member, such as a plate, rod or bar extending between the left and right intermediate flexures. For example, by coupling the output end of a linear actuator (such as a lead screw-type actuator) to the middle region of the deflectable member, extending the actuator will deflect the mid-portion of the member upward, pulling the end points, and thus the coupled left and right intermediate flexures, closer together. The amount which the upper wall moves (relative to the lower wall) in response to a given movement of the actuator can be configured by selecting or adjusting the angles defined by the intermediate, upper and lower flexures of each sidewall and/or the manner in which the actuator is (directly or indirectly) coupled to the left and right intermediate flexures. Because certain portions are provided with relative movement by flexures (as opposed to, for example, hinges), portions which move relative to one another can be provided as regions of a single integral part, without the need for or use of joints between separate parts. Such a single integral piece is thus more easily maintained at a substantially uniform temperature and the potential for failure of hinges or other couplings between separate parts is reduced or eliminated.

In another embodiment, the fine positioning system includes: (a) a flexure member including an upper wall, a lowers wall and at least two sidewalls coupling the upper and lower walls; and (b) a linkage configured to change the distance between the intermediate flexure joints of the two or more sidewalls in response to movement, particularly rotational movement, of a motor shaft. Each sidewall is movably coupled to the upper wall at a flexure joint defining upper flexure axes and to the lower wall at a flexure joint defining lower flexure axes, and has an intermediate flexure joint to accommodate positive and negative vertical movement of the upper wall with respect to the lower wall. The linkage includes a flexure member having at least one flexure joint defining a flexure axis and a displacement controlling member engaging the flexure member. The displacement controlling member is coupled to the motor shaft and includes at least one flexure joint defining an oscillatory flexure axis that is offset or distinct from the flexure axis of the flexure member. Typically, the oscillatory flexure axis is transverse to the flexure axis of the flexure member. In one configuration, the oscillatory flexure axis permits horizontal and vertical displacement of the displacement controlling member while imparting vertical displacement only to any portion of the flexure member.

In another configuration, the linkage includes a cam, or device for displacing the displacement controlling member in transverse first and second directions. The displacement controlling member is configured to displace at least a portion of the flexure member about the member's flexure joint in the first direction and dampen the movement of the at least a portion of the flexure member in other directions.

In one configuration, the structure includes left, right, front and rear sidewalls coupling the upper and lower walls. Each sidewall is movably coupled to the upper wall at a flexure joint defining upper flexure axes and to the lower wall at a flexure joint defining lower flexure axes. Each sidewall has an intermediate flexure joint to accommodate movement of the upper wall with respect to the lower wall.

Flexures, as described herein, are believed particularly useful in operation at cryogenic temperatures, especially when formed of suitable cryogenic materials such as titanium alloys, beryllium and the like. The relatively strong flexure structure that can be achieved in this fashion not only provides a component better able to withstand launch acceleration and vibrations or other stresses, but offers a potential for a component which acts both as a support for a mirror (or other optical component) and an actuator (rather than requiring separate actuator and mirror support).

According to a second aspect of the present invention, a positioning device, e.g., actuator, is provided that is capable of performing both fine and coarse adjustments in a highly efficient manner. The device is particularly useful for adjusting the position of optical and communications components, especially in cryogenic or space applications. The device includes a fine positioning system for fine displacements of the object in a desired direction (e.g., a fine positioning means for displacing the object to a target position); a coarse positioning system for coarse displacements of the object in the desired direction (e.g., coarse positioning means for displacing the object to a coarse position approximating the target position); a motor having a shaft engaging the fine and coarse positioning systems; and a coupling (or coupling means) for selectively engaging and disengaging the coarse positioning system from the shaft. In this manner, a common motor is capable of operating both the fine and coarse positioning systems.

The fine and coarse positioning systems can be of any gear driven configuration as will be evident to those of ordinary skill in the art. In a preferred configuration, the fine positioning system is the flexure structure described above and the coarse positioning system includes a threaded coarse positioning shaft engaging the motor shaft by means of a plurality of interlocking gears. The threaded coarse positioning shaft is received in a threaded nut that is fixedly attached to a support surface. As the threaded coarse positioning shaft is rotated clockwise or counterclockwise, depending on the direction of turning of the threads, the shaft is elevated or lowered relative to the threaded nut, thereby elevating or lowering the attached object.

In one configuration, the coupling includes a pair of opposing gears. Each of the opposing gears has or is engaged with a locking member configured such that, in a first mode when the locking members are disengaged from one another, the opposing gears are independently rotatable in forward (e.g., clockwise) and reverse (e.g., counterclockwise) directions and in a second mode when the locking members are engaged with one another, the opposing gears are not independently rotatable from one another in at least one of the forward (e.g., clockwise) and reverse (e.g., counterclockwise) directions. In the first mode, the fine positioning system is able to make positive or negative adjustments to the position produced by the coarse positioning system without movement of the coarse positioning system.

In another embodiment, a method for positioning an object is provided. The method includes the steps of:
(a) rotating a motor shaft in a forward (e.g., clockwise or counterclockwise)direction to displace the object to a coarse position approximating a target position; and
(b) rotating a motor shaft in a reverse (e.g., counterclockwise or clockwise, respectively) direction opposite the forward direction to disengage a coarse positioning member from the motor shaft and to displace the object to the target position using a fine positioning member engaging the motor shaft.

In one process configuration, during the rotating step (a) both the fine and coarse positioning members displace the object.

In another process configuration, rotating step (b) includes the substeps of:
(i) rotating a cam to displace a displacement controlling member in first and second directions, wherein the first and second directions are transverse to one another;
(ii) displacing at least a portion of a flexure member in the first direction with substantially no displacement of the at least a portion of the flexure member in the second direction; and
(iii) displacing at least two sidewalls of a flexure structure either inwardly or outwardly, thereby causing an end surface of the structure to be displaced in the first direction.

The present invention thus provides a structure which is usable in connection with technical, scientific (e.g. astronomical) or other instrumentation to achieve fine position adjustments in a manner which is practical for space-based telescopes or other technical or scientific instruments.

DETAILED DESCRIPTION OF THE PREFERRED EMBODIMENTS

Figure 1:
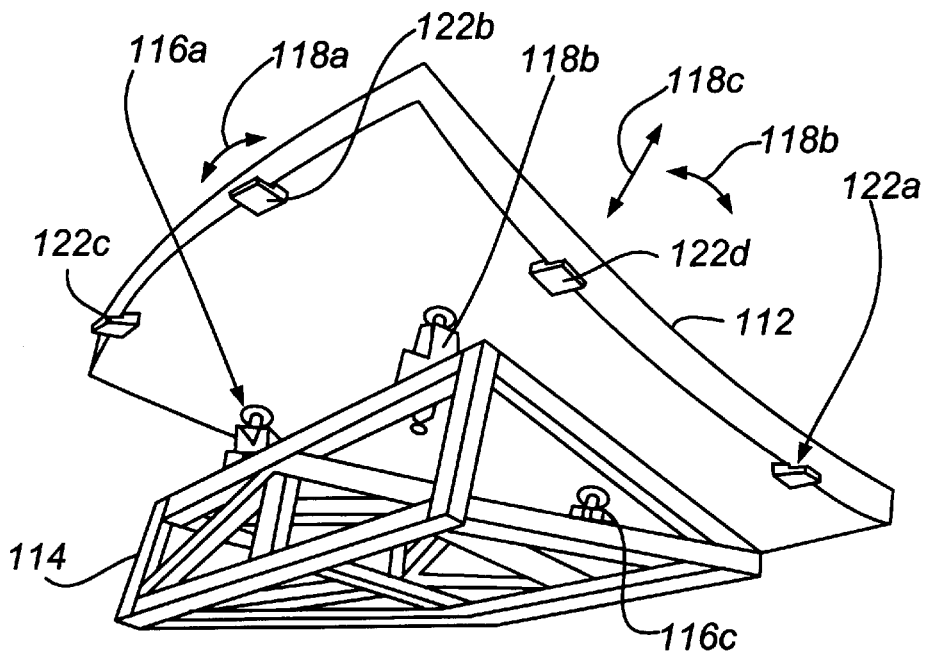
FIG. 1 is a rear perspective view of a mirror segment coupled to back plane by actuators according to an aspect of the present invention.

As depicted in FIG. 1, a telescope mirror segment 112 may be coupled to a back plane 114 or similar structure by one or more (as depicted, three) actuator/flexure assemblies 116a, b, c. Such coupling provides for adjustment of position with at least three degrees of freedom, such as tilt 118a, tip 118b and focus (or "piston") 118c motions. In the depicted embodiment, edge sensors 122a, 122b, 122c, 122d provide positional information or feedback for use in adjusting the position of the mirror segment 112. Although the actuator/flexure assemblies of the present invention can be used for positioning mirror segments or other optical electronic or other components in a variety of types of instruments, one use of an actuator flexure of the present invention is in connection with mirror segments for a space-based or earth-orbiting telescope, such as that described, for example, in Ser. No. 08/879,740 (supra), U.S. Pat. No. 5,898,529. In this application, the actuators would be used to position, with high accuracy, each of a plurality of independently movable primary mirror segments so that the primary mirror is properly aligned and focused with respect to other optical elements (secondary mirror, detectors and the like). In one embodiment, these goals involve providing adjustment with a resolution of about 10 nanometers or less over a range of at least +/−0.1 mm. In one embodiment, the flexure assembly provides a motion reduction ratio (with respect to actuator motion) of at least about 10:1, preferably at least about 12:1 and more preferably at least about 15:1 (i.e., unit movement of the mirror for every 15 units of movement by the actuator). Other resolutions, ranges and reduction ratios for other applications may be achieved by appropriate modifications to the embodiments disclosed herein as will be apparent to those of skill in the art after understanding the present invention.

Figure 2:
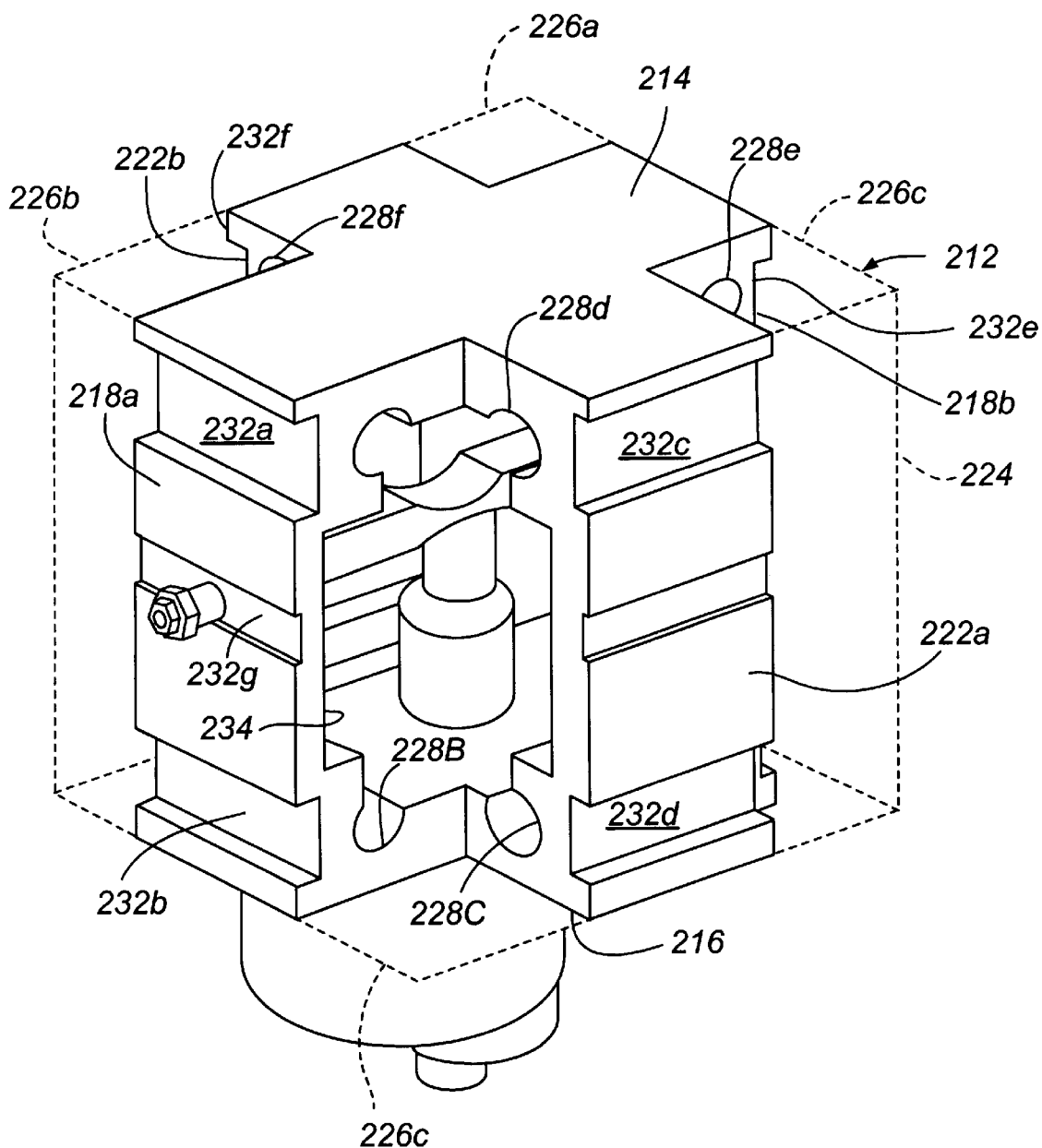
FIG. 2 is a perspective view of a flexure/actuator structure according to an embodiment of the present invention.
Figure 3:
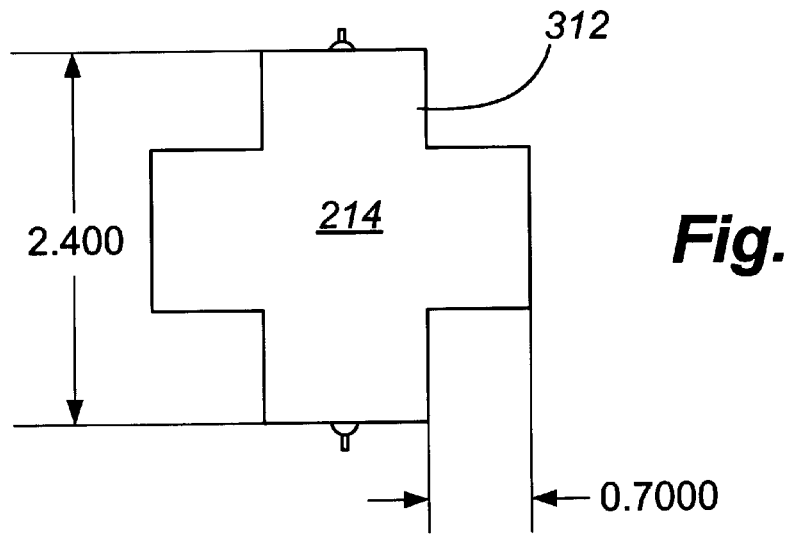
FIG. 3 is a top plan view of an actuator/flexure structure according to an embodiment of the present invention.

FIG. 2 depicts one embodiment of a flexure assembly/actuator assembly. The flexure structure 212 includes an upper wall 214, a lower wall 216, a left sidewall 218a, a right sidewall 218b, a front sidewall 222a, and a rear sidewall 222b. Preferably the flexure structure 212 is formed of a single integral unitary piece substantially without joints between separate pieces or parts, such as may be formed by machining a single block of starting material. For example, starting with a substantially rectilinear starting block 224, corner regions 226a, b, c, d may be removed by machining (e.g. sawing) to form a cruciform cross section (e.g. as depicted in FIG. 3, 312), rounded-profile regions 228a through 228f may be formed by drilling, recess regions 232a–f, 232g may be formed by machining and the interior region 234 may be formed by machining.

Figure 4:
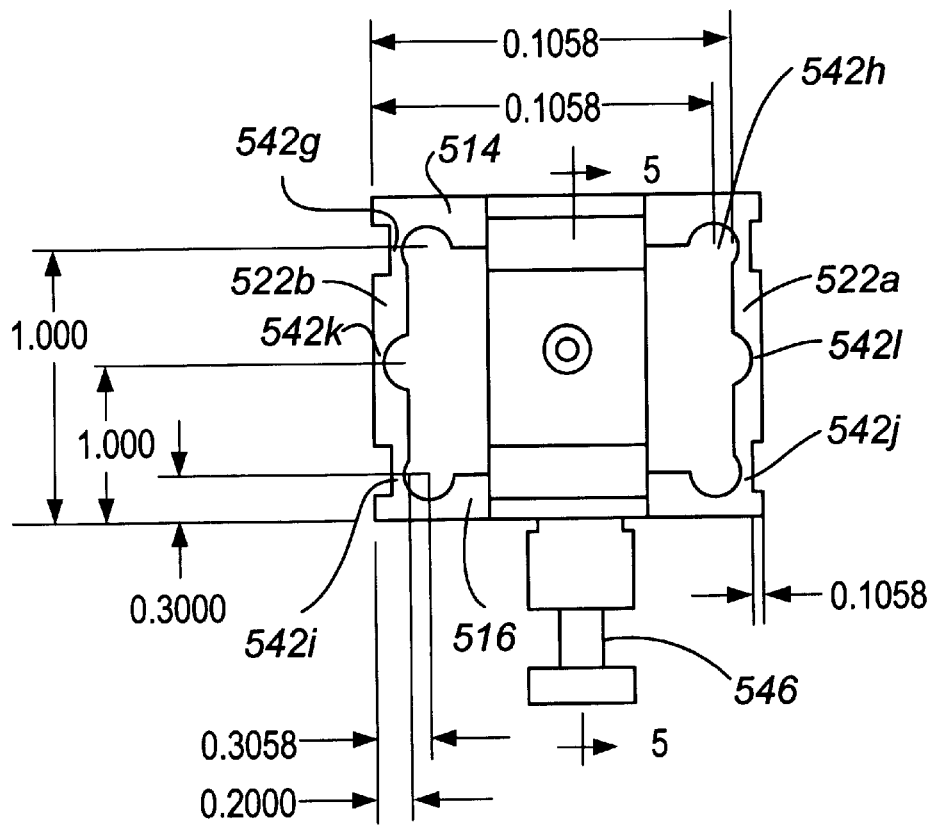
FIG. 4 is a side plan view of the flexure/actuator structure of FIG. 3.
Figure 5:
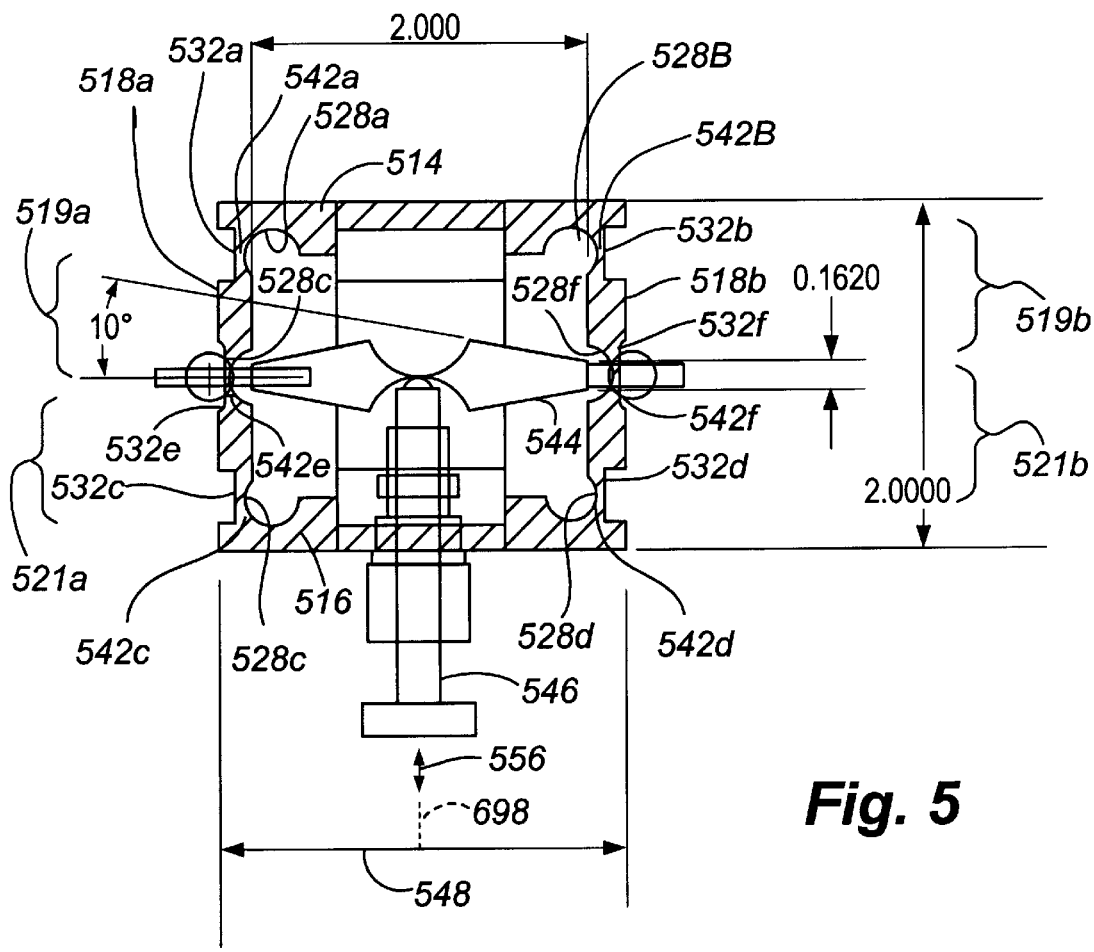
FIG. 5 is a cross-sectional view taken along line 5—5 of FIG. 4.

As seen in FIGS. 4 and 5, in one embodiment, left and right sidewalls 518a, 518b include upper rounded profile regions 528a, 528b and upper recess region 532a, 532b to form upper end regions therebetween defining upper left and right flexure axes 542a, 542b. Lower rounded profiles 528c, 528d and lower recessed regions 532c, 532d provide thinned regions therebetween to define lower flexure axes 542c, 542d. Intermediate rounded profile regions 528e, 528f and recesses 532e, 532f define thinned regions therebetween to define intermediate flexure axes 542e, 542f. The rounded profiles 528 and recesses 532 extend substantially fully across the left and right sidewalls 518a, 518b to define flexure axes 542a, b, d, c, e, f, permitting flexure across the extent of the left and right sidewalls 518a, 518b (axes extending perpendicular to the plane of the paper in the view of FIG. 5). Although left and right sidewalls depicted in FIG. 5 may suffice to achieve the desired motion reduction, preferably front and rear sidewalls 522a, 522b provide additional strength and stability to the structure as well as helping to assure that the upper wall 514 is maintained parallel to the lower wall 516 during use. Maintaining the walls parallel is useful in achieving predictable and reproducible mirror segment movement. Preferably the front and rear walls are provided with rounded profiles and/or recesses to define upper, lower and intermediate flexure axes 542g through 542l in a fashion similar to that described and depicted for the left and right sidewall so that the resultant symmetry assists in maintaining the upper wall 514 parallel to the lower wall 516 as described.

An adjustable, (in the depicted embodiment, deflectable) member 544 is coupled to the intermediate flexures of the left and right walls 542e, 542f such that, in a manner described more fully below, deflection of the member 544 (e.g. in response to linear movement of the actuator 546) affects or adjusts the distance 548 between the left and right sidewall flexure axes 542e, 542f. In the embodiment depicted in FIG. 5, the member 544 includes left and right wing portions 552a, 552b with a thinned portion therebetween 554 so that upon movement 556, e.g. upward movement, of the actuator 546, the central region of the member 544 will be deflected upward. A number of actuators may be used in connection with the present invention. One example of an actuator which may be used, at least at non-cryogenic temperatures, are those sold under the trade name "New Focus Picomotor" available from New Focus, Inc., Santa Clara, Calif. Other actuators include magnetostrictive actuators such as those available from Energen and piezoactuators.

Figure 6:
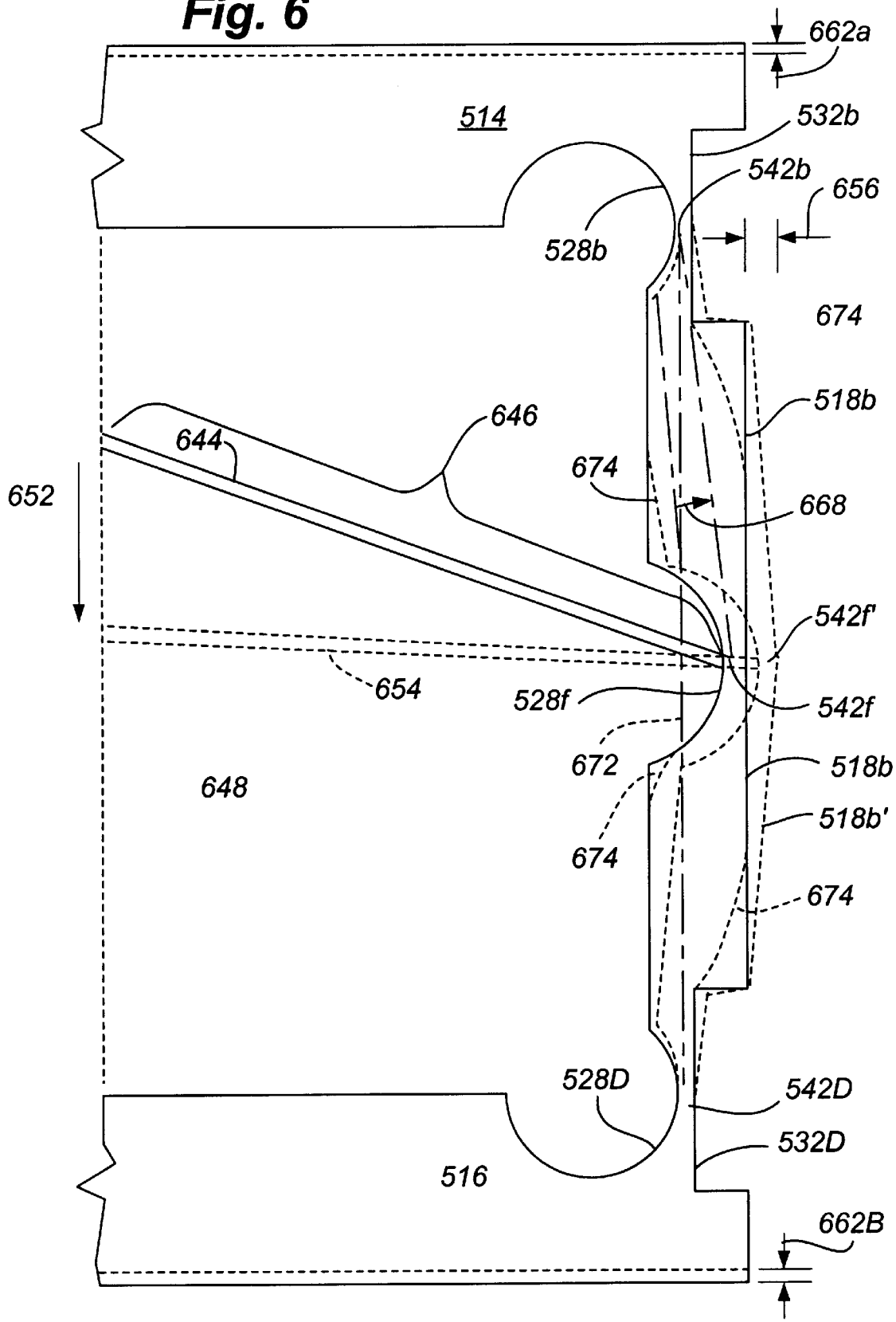
FIG. 6 is a schematic cross-sectional view of a flexure structure according an embodiment of the present invention.

As depicted in FIG. 6, an upwardly-deflected member 644 defines a first distance 646 from the center line 648. It is also possible to configure the device such that the member 646 may be deflected downward (i.e. toward the lower wall) from a line joining the intermediate flexures. In the depicted embodiments, if the actuator 546 is activated to move the center portion of the member 644 downward 652, member 644 in the new position 654 will cause a deflecting outward force on the sidewall 518*b* causing the sidewall 518*b* to deflect a distance 656 outward at its midpoint (exaggerated, in FIG. 6, for clarity) with the sidewall 518*b*, as a result, flexing at the flexure axes 542*b*, 542*d*, 542*f*. A symmetric deflection and flexure occurs in the left sidewall. Outward deflection of the sidewall 518*a*, 518*b* causes the upper and lower walls 514, 516 to move towards each other by a distance 662*a* plus 662*b*, which is less than the distance 652 traveled by the actuator, thus achieving the motion reduction desired.

The magnitude of the reduction ratio will depend upon a number of factors. Although it is possible to provide various systems for adjusting the distance 548 between the intermediate flexure axes 542*e*, 542*f*, the particular geometry of the depicted system, (viz. the deflectable member 644) will have an effect since, as depicted in FIG. 6, this geometry will define the ratio of change in distance 548 with respect to movement or displacement 652 of the actuator 546. The magnitude of the overall reduction ratio will also depend, in the depicted configuration, upon the size of the angle 668 defined by the intermediate flexure access 542*f* with respect to an imaginary line 672 joining the upper and lower flexure axes 542*b*, 542*d*, as shown in FIG. 6. In one embodiment, the angle 668 is between about 5° and about 15°, preferably about 10°. Since the location of the flexure axes 542*b*, 542*f*, 542*d* is determined by the curvilinear recesses 528*b*, 528*d*, 528*f* and the relief regions 532*b*, 532*d*, the position of these features may be selected to provide the desired angle 668 e.g. so as to achieve, in combination with other factors, a desired reduction ratio. The size and location of the flexure axis-defining features 528*b*, 528*d* 528*f*, 532*b*, 532*d* will also affect the local resistance to bending, i.e. the susceptibility to flexure. For example, if it is desired to increase the tendency or susceptibility of the upper flexure 542*b* to bending or flexing, since the susceptibility to flexing is, in general, increased by creating a thinner sidewall region in the vicinity of the flexure 542*b*, additional machining of the relief region 532*b* to further thin the sidewall in the vicinity of region 542*b* would have the effect of increasing the susceptibility or tendency towards bending flexing at the flexure 542*b*. Thus, the local sidewall thickness in the region of various flexures 542*b*, 542, 542*f* may be selected or adjusted e.g. to achieve a balance between the desired strength of the flexure assembly and the tendency or susceptibility to bending or flexing (which in turn affects the amount of force needed to achieve a given displacement). Preferably such reprofiling substantially preserves the ability of the flexure to avoid bending at points distant from the flexure axes. The present invention is thus preferably rigid in all axes.

Although the flexure structure has been depicted as defining substantially rectilinear or planar edges or surfaces (other than the round, elliptical or otherwise curved recess regions), other shapes or configurations are possible. In particular, it may be useful to provide other profiles such as those depicted in FIG. 6 in phantom lines 674 e.g. to reduce the total mass or size of the structure.

Figure 7:
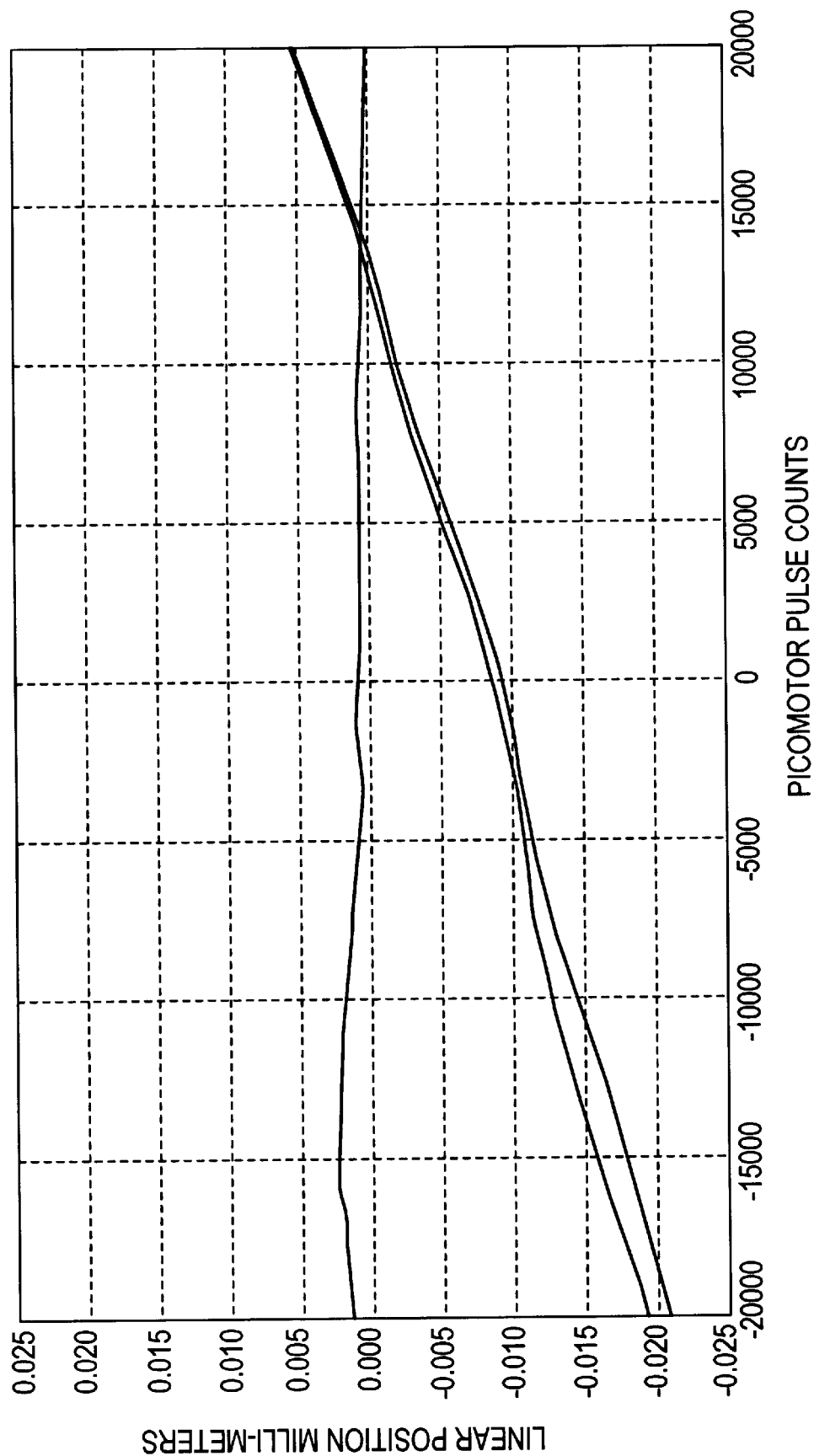
FIG. 7 is a graph depicting linear position resulting from the range of actuator motor steps provided by a device according to an embodiment of the present invention.

FIG. 7 depicts results of testing a device generally constructed according to FIGS. 3–5. In the depiction of FIG. 7, the Y-axis values indicate the amount of displacement, in millimeters, of the top surface of the flexure structure with respect to the bottom surface as a function of the number of actuator (e.g. picomotor) pulse or step counts (+/− with respect to a reference position). In this test, each actuator step or pulse corresponded to an actuator displacement of about 9 nanometers. The relatively constant slope of the resulting plots 712*a*, 712*b* representing, respectively, clockwise motor rotation and counterclockwise motor rotation, shows a substantially constant reduction ratio throughout the range of (output) motion in the test (approximately 0.025 mm). The difference between clockwise and counterclockwise rotation curves demonstrates relatively low hysteresis 714 with respect to this factor.

Figure 8:
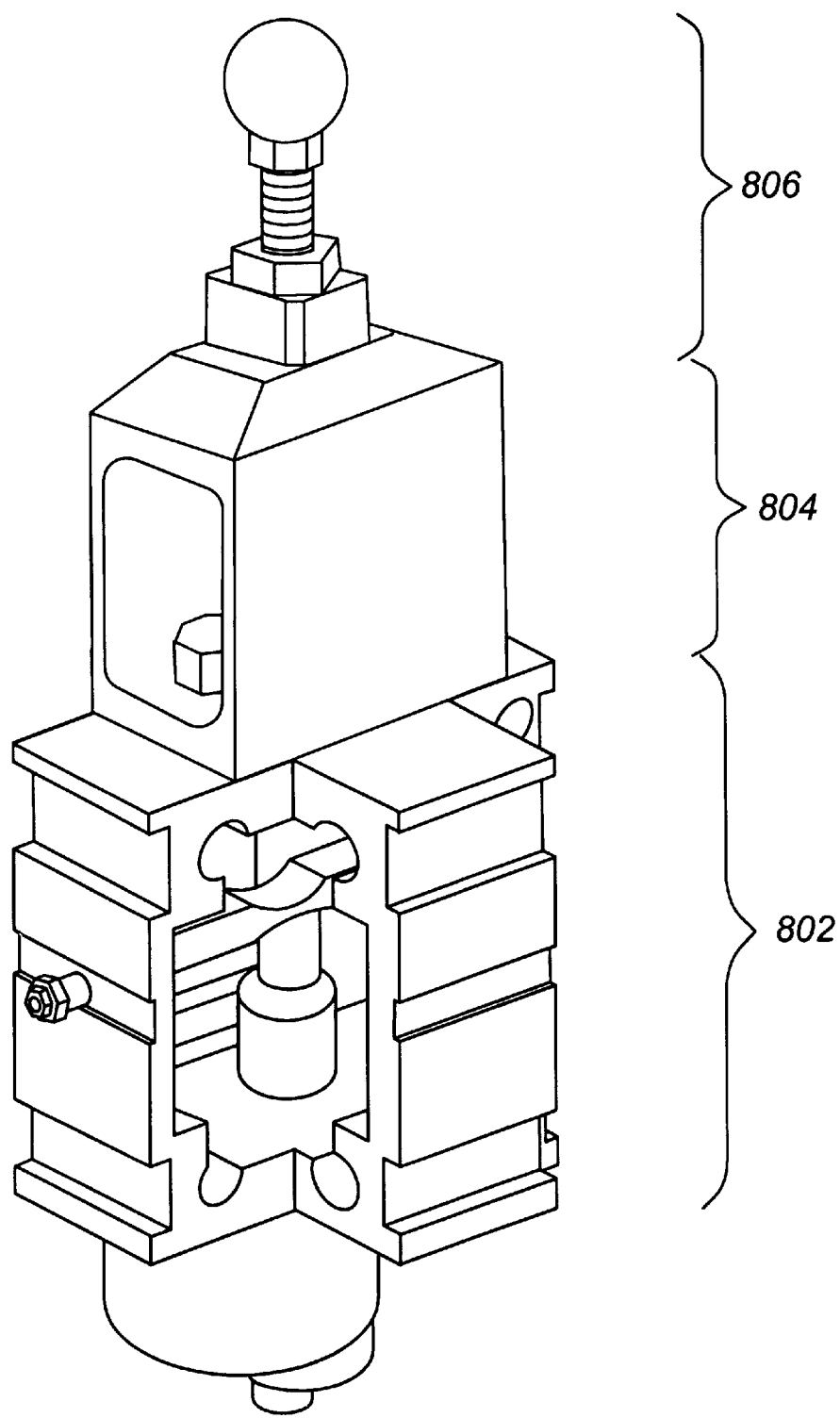
FIG. 8 is a perspective view of an actuator/flexure device with a mirror mount structure according to an embodiment of the present invention.

FIG. 8 depicts an actuator/flexure assembly similar to that depicted in FIG. 2 but in which the main flexure structure 802 is coupled to an upper structure 804 for adjustably mounting a ball mount 806 for coupling to a mirror. In the depicted embodiment, the ball mount 806 is adjustably coupled to permit relatively coarse adjustment. In the embodiment depicted in FIG. 8, the upper structure may be configured to provide an amount of lateral flexure e.g. to accommodate thermal (expansion and contraction) movements.

Figure 9:
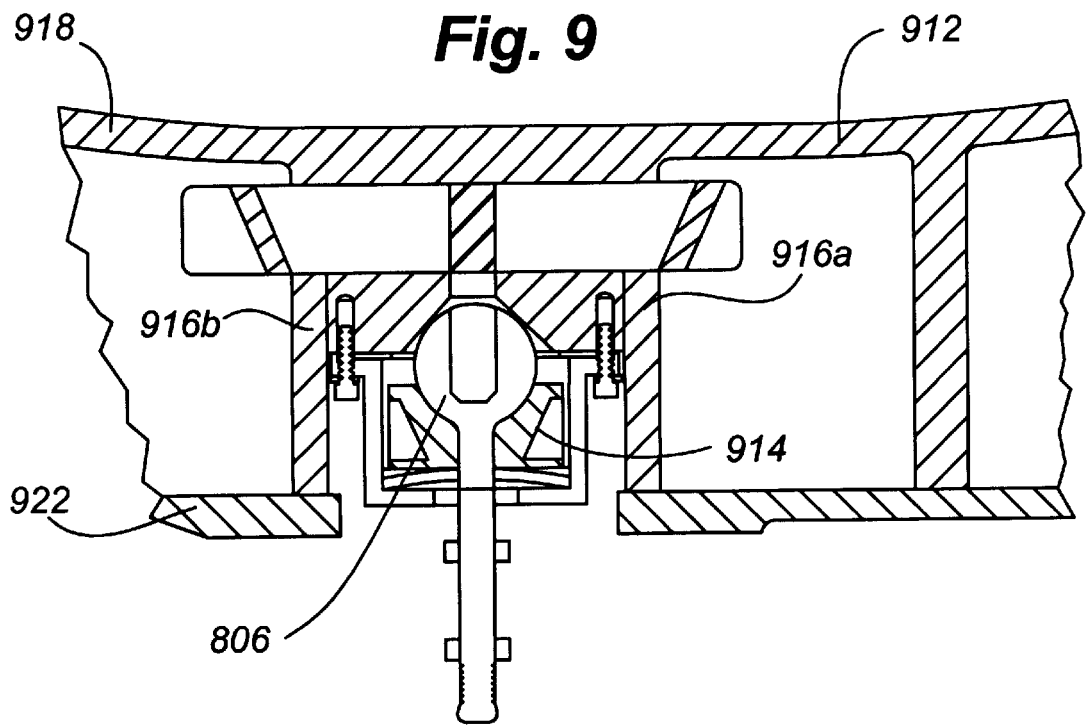
FIG. 9 is a cross section depicting one manner of coupling a mirror mount structure to a mirror segment.

FIG. 9 depicts one manner of coupling the ball mount 806 to a telescope mirror segment 912 via a conical race 914 mounted to mirror ribs 916*a*, 916*b* which couple the mirror face sheet 918 to a mirror back sheet 922.

Figure 10:
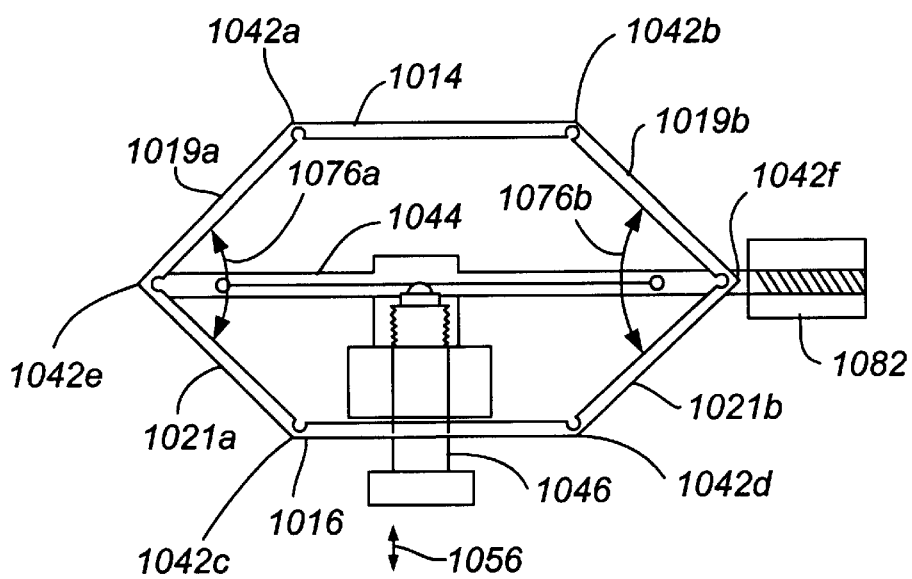
FIG. 10 is a schematic side view of a flexure/actuator device including coarse adjustment according to an embodiment of the present invention.

FIG. 10 depicts a configuration providing for relatively coarse, as, well as fine, adjustment of displacement in the distance between the upper wall 1014 and lower wall 1016. In the configuration of FIG. 10, fine adjustment is achieved in a fashion similar to that described above in connection with FIGS. 3–6. In particular, longitudinal movement 1056 of actuator 1046 results in deflection of member 1044 which, owing to flexures 542*a* through 1042*f*, adjusts the distance between intermediate flexures 1042*e*, 1042*f*, in turn affecting the angles 1076*a, b* defined by the upper 1019*a*, 1019*b* and lower 1021*a*, 1021*b* portions of the left and right sidewalls to raise or lower the upper wall 1014 with respect to the lower wall 1016. Coarse adjustment, in the embodiment of FIG. 10, can be achieved by using the screw-threaded coupling 1082, rotatably coupled to an extension of the member 1044, to change the distance between intermediate flexures 1042*e*, 1042*f* with relatively coarse resolution.

Figure 11:
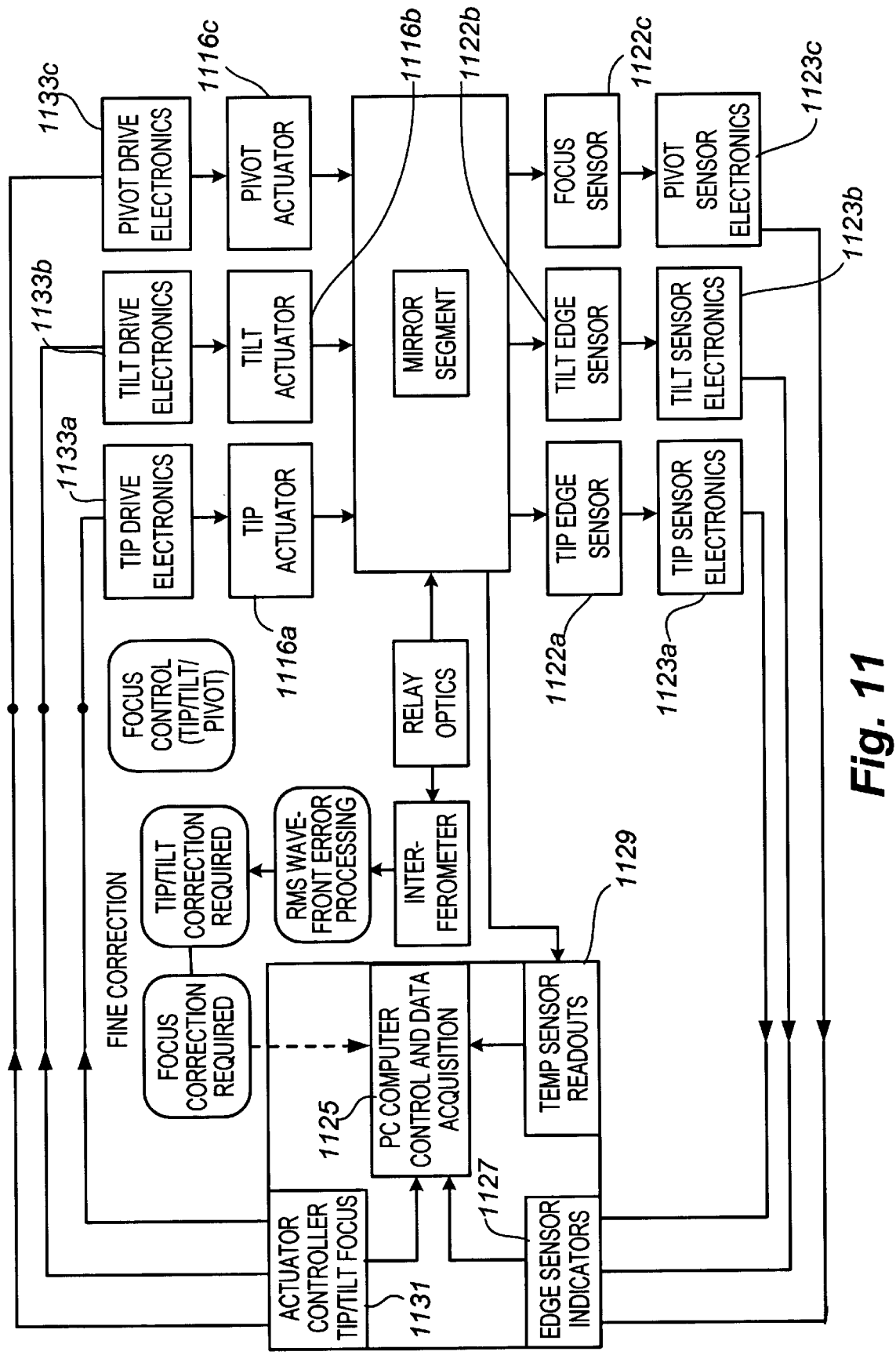
FIG. 11 is a block diagram depicting components of a space telescope using actuators for adjustment according to an embodiment of the present invention.

Preferably, adjustment of mirror segments is achieved by remote and/or automatic control, e.g. using a feedback loop employing data from edge sensors 1122*a*, 1122*b* and, where appropriate, focus sensor 1122*c*, as depicted in FIG. 11. Coupled electronics 1123*a, b, c* provide data to a computer 1125 via edge sensor indicators 1127. The computer, using other data as needed, such as temperature sensor data 1129, provides signals to actuator controller 1131 for outputting control signals to drive electronics 1133*a, b, c* for driving actuators 1116*a, b, c*.

In light of the above description, a number of advantages of the present invention can be seen. The present invention is able to achieve relatively high-resolution (fine) positional adjustment in response to (lower resolution) actuator movement throughout a relatively wide range of movement or displacement. By providing a sufficiently high reduction ratio, it may be possible to use a relatively coarser resolution (and thus less expensive) actuator than otherwise used. The present invention provides a single assembly or structure which achieves both actuator (adjustment) and mirror support functions preferably providing substantial strength and stability in all axes and preferably is able to provide support while withstanding launch forces. In one embodiment the actuator/flexure can support a relatively high mass mirror segment such as a mirror segment having a mass of about 10 pounds (about 4 kilograms) even under launch conditions involving relatively high accelerations such as 9 to 10 times gravitational acceleration or more. By providing a flexure or actuator/flexure structure capable of substantially supporting a mirror segment, and capable of withstanding launch forces, it may be possible to avoid the need for a launch snubber and thus decrease payload weight. The present invention is able to operate reliably at cryogenic temperatures as well as non-cryogenic (such as "room" temperature). The flexure/actuator can be provided with relatively low mass or size such as to facilitate launch of a space-based telescope. Although the present invention has been described particularly in connection with a space-based telescope, other technical or scientific instruments may benefit from application of the present invention including ground based, airborne or other telescopes, interferometers and the like. Although the present invention has been described in connection with mirror segment positioning, the present invention may be applied for additional purposes such as adaptive optics, including optics used for compensating for gravitational effects during telescope mirror positioning or tracking.

A number of variations and modifications of the above-described aspect and embodiments of the invention can be used. Although in the depicted embodiment, upper and lower walls are maintained parallel, in other applications it may be desirable to move the upper wall through an angle with respect to the lower wall. Although the depicted configuration shows three actuators coupled to a mirror segment e.g. for mirror segment positioning, more or fewer actuators can be used, such as by coupling a fourth actuator for affecting mirror curvature. Although a particular ball mount apparatus has been depicted, other devices for coupling the actuator/flexure to a controlled object can be used.

An actuator 2000 utilizing a flexure structure 2004 according to another embodiment as a fine positioning system 2008 is depicted in FIGS. 12–17. The actuator includes the fine positioning system 2008, a coarse positioning system 2012, a motor assembly 2016, and a coupling assembly 2020 for selectively engaging or disengaging the coarse positioning system 2012.

The Fine Positioning System

Referring to FIGS. 12–28, the fine positioning system 2008 includes a flexure structure 2004 having upper and lower walls 2028a,b and left, right, front and rear sidewalls 2032a–d coupling the upper and lower walls. Each of the sidewalls 2032a–d is movably coupled to the upper and lower walls at a flexure joint 2036a–h having a respective upper and lower flexure axis 2040a–h. Each of the sidewalls further includes at least one intermediate flexure joint 2042a–f having a respective flexure axis 2044a–f to accommodate movement of the upper wall relative to the lower wall. The left and right sidewalls 2032a, b each have two intermediate flexure joints 2042b, c, e, f.

A linkage 2050 configured to change the distance between the intermediate flexure joints of the left and right sidewalls includes a deflection or flexure member 2054 movably attached to each of the opposing sidewalls 2032a, b between the intermediate flexure joints 2042b, c, e, f and rigidly attached at its top 2058 to a displacement controlling member or cam follower 2062. Unlike the flexure member 544 above, flexure member 2054 has two thinned portions 2066a, b each having a separate flexure axis 2070a, b (which is normal to the plane of the page). Vertical displacement 2074 is imparted to an unthinned center portion 2078 of the member 2054, thereby causing deflection or flexure about each of the flexure axes 2070a,b simultaneously.

Figure 12:
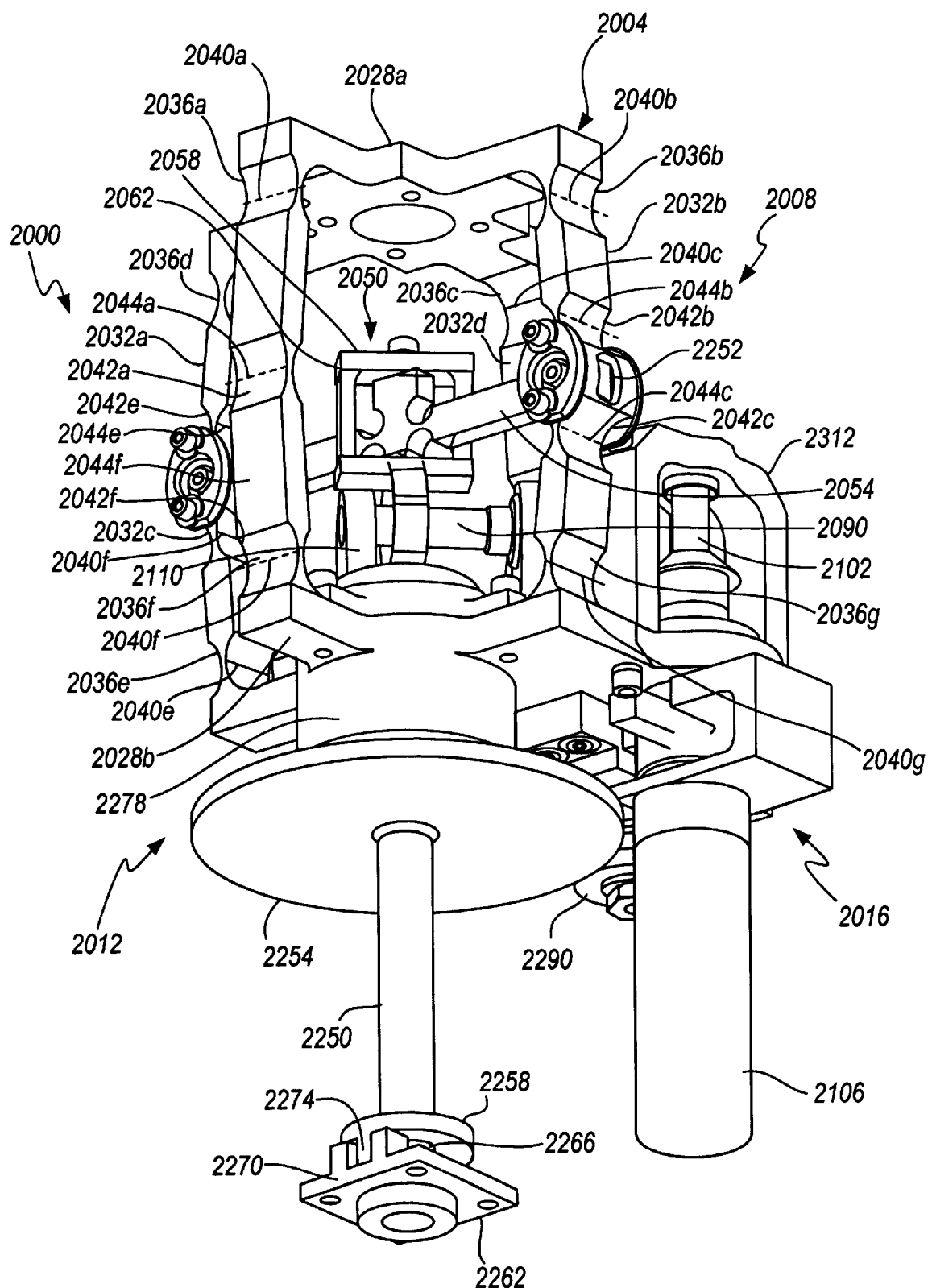
FIG. 12 is a lower perspective view of an actuator according to another aspect of the present invention.

A cam 2082 (FIG. 15) is received in a ring 2086 extending downwardly from the bottom of the displacement controlling member 2062 (FIG. 19) and is rigidly attached to an off-center or eccentric cam shaft 2090 (FIG. 12). The cam shaft 2090 is in turn rigidly attached to bevel gear 2094 (FIG. 13) that engages bevel gear 2098 that is rotated by the shaft 2102 of the motor 2106. The cam shaft 2090 is rotatably mounted in the cam shaft housing 2110, ring 2086, and cam shaft bracket 2114 by means of radial bearings 2118a–c. The radial bearings can be preloaded by shims if desired to limit or reduce movement of the bearing in the bearing mount.

Figure 19:
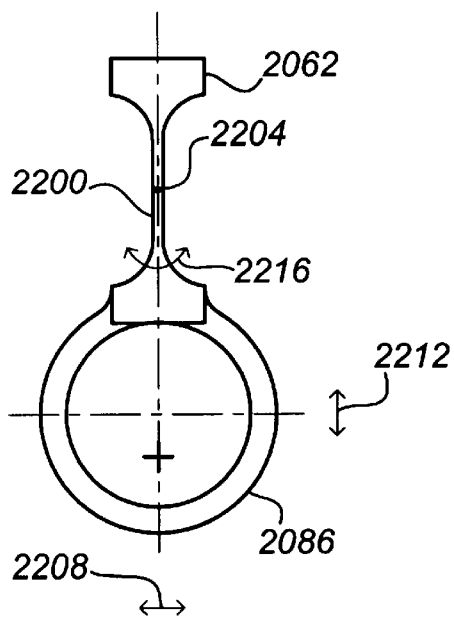
FIG. 19 is a side view of a motion or displacement controlling member according to an embodiment of the present invention.
Figure 20:
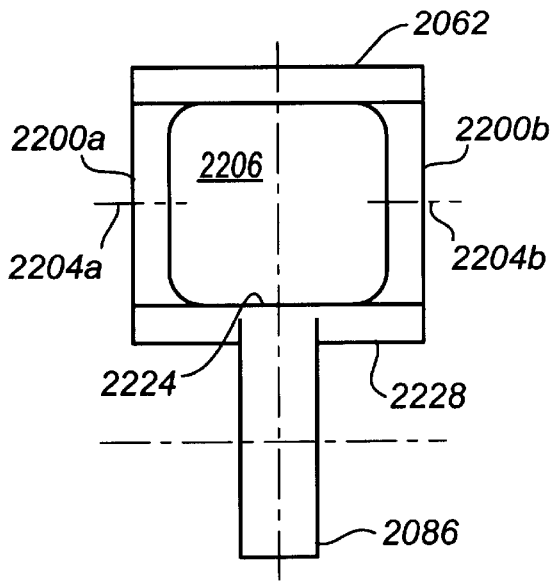
FIG. 20 is a front view of the motion or displacement controlling member of FIG. 19.
Figure 21:
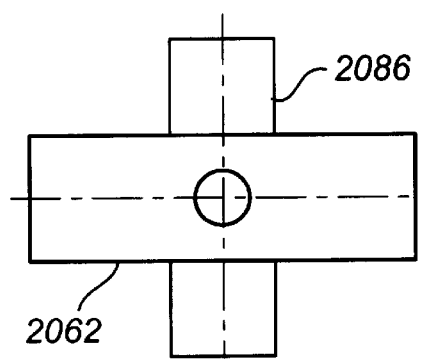
FIG. 21 is a top view of the motion or displacement controlling member of FIG. 19.

Referring to FIGS. 19–21, the displacement controlling member 2062 includes opposing thinned sidewalls 2200a, b having flexure axes 2204a,b, respectively. Because the cam shaft 2090 is mounted off-center in the cam 2082, rotation of the cam 2082 will cause the ring 2086 to be displaced both horizontally 2208 and vertically 2212 at the same time. As will be appreciated, the flexure member 2054 must be substantially free of horizontal displacement for proper operation of the flexure structure 2004. The thinned sidewalls 2200a,b of the displacement controlling member 2062 absorb or dampen the horizontal displacement component 2208 produced by the cam 2082 by deflecting or flexing horizontally 2216 about the flexure axes 2204a, b (FIG. 19). To provide the thinned sidewalls with freedom of movement side-to-side in response to the oscillatory movement of the ring 2086, the bottom surface 2220 of the central portion 2078 of the flexure member 2054 (which is received in the center 2206 of the cam follower 2062) is located above and spaced from the top surface 2224 of the lower wall 2228 of the cam follower 2062. As can be seen from FIG. 21, the upper portion 2232 of the follower 2062 and ring 2086 define a cruciform-type structure.

Figure 17:
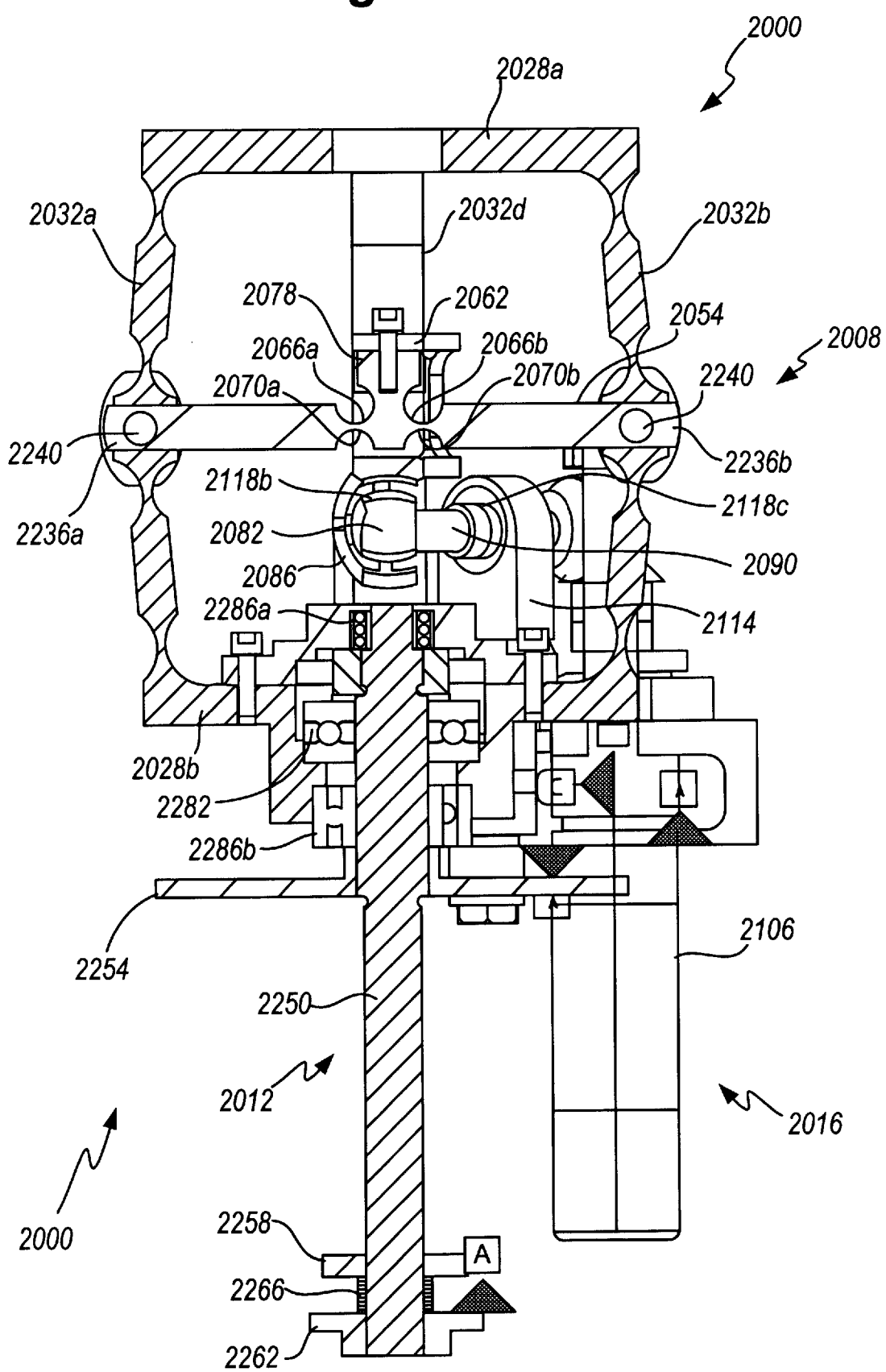
FIG. 17 is a cross-sectional view along line 17—17 of FIG. 14.
Figure 18:
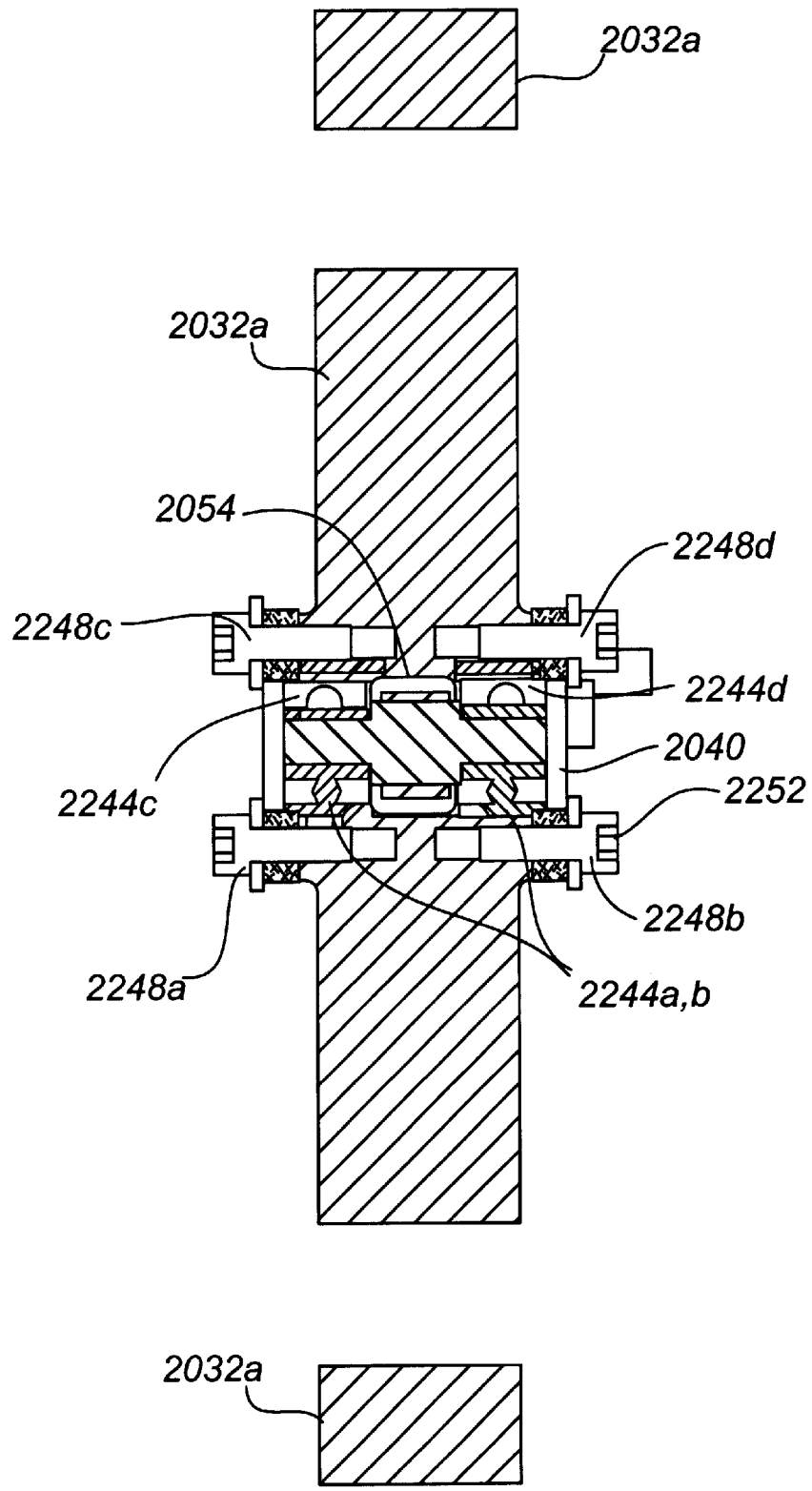
FIG. 18 is a cross-sectional view along line 18—18 of FIG. 14.

Referring to FIGS. 17 and 18, either end 2236a,b of the flexure member 2054 is movably (i.e., rotatably)connected to the respective sidewall 2032a, b by a pivot pin 2240 and preloaded radial bearings 2244a–d. Bearing blocks 2248a–h hold the radial bearings in position. the flexure member 2054 is positioned in the interior of the flexure structure by passing the member 2054 through slot 2252 and the pin 2240 is thereafter passed through each of the pin holes 2256a, b on either end of the member 2054.

The Coarse Positioning System

Referring to FIGS. 12–17, the coarse positioning system 2012 includes a threaded drive shaft 2250 engaging a spur gear 2254, a jam nut 2258, and a drive nut 2262. The drive nut 2262 is attached to a fixed support surface (not shown) and causes upward or downward displacement of the drive shaft 2250 as the shaft 2250 is rotated either clockwise or counterclockwise. The jam nut 2258 is discrete and spaced apart from the drive nut 2262. A spring 2266 is located between the jam nut 2258 and drive nut 2266 to preload the drive and jam nuts 2258 and 2266 and bias out any play in the threads of the drive shaft 2250 and to reduce backlash. Preloading of the nuts substantially eliminates nonlinearity in the operation of the coarse positioning system. As will be appreciated, play in the threads of the drive shaft 2250 can be caused by an irregularity in the thread of the drive shaft 2250 and/or drive or jam nut 2258, 2262 and/or vibration of the actuator during operation. To ensure that the jam and drive nuts 2258, 2262 rotate synchronously and thereby maintain the proper distance between the jam and drive nuts 2258, 2262, the drive nut 2258 includes a notch 2270 that receives a matching locking arm 2274 on the jam nut 2258 (FIG. 12).

Figure 15:
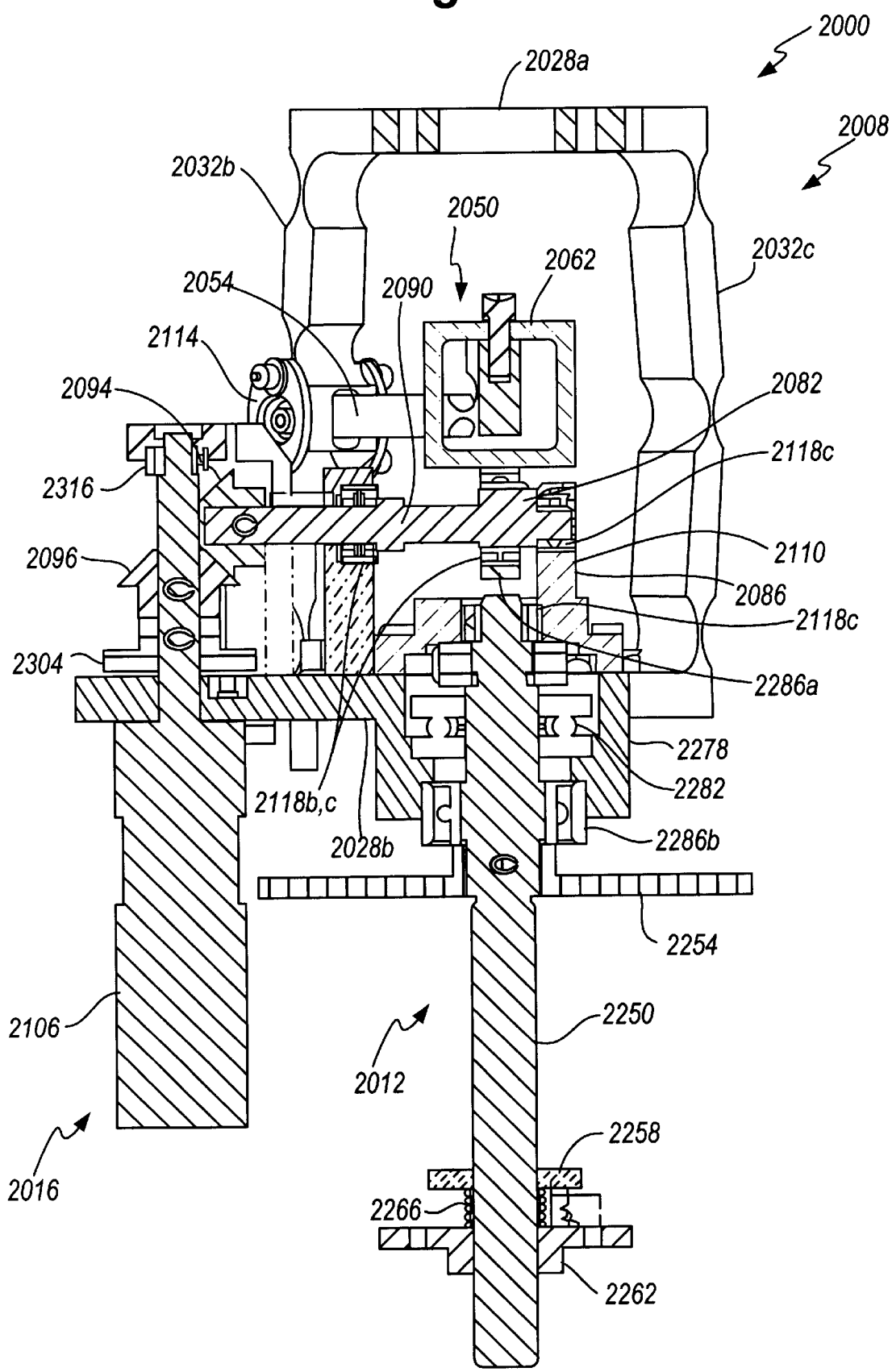
FIG. 15 is a cross-sectional view along line 15—15 of FIG. 14.

Referring to FIG. 15, the lower wall 2028b receives the drive shaft 2258 in a cylindrical housing 2278. Preloaded thrust bearing 2282 and radial bearings 2286a, b rotatably mount the drive shaft 2250 in the cylindrical housing 2278.

Figure 13:
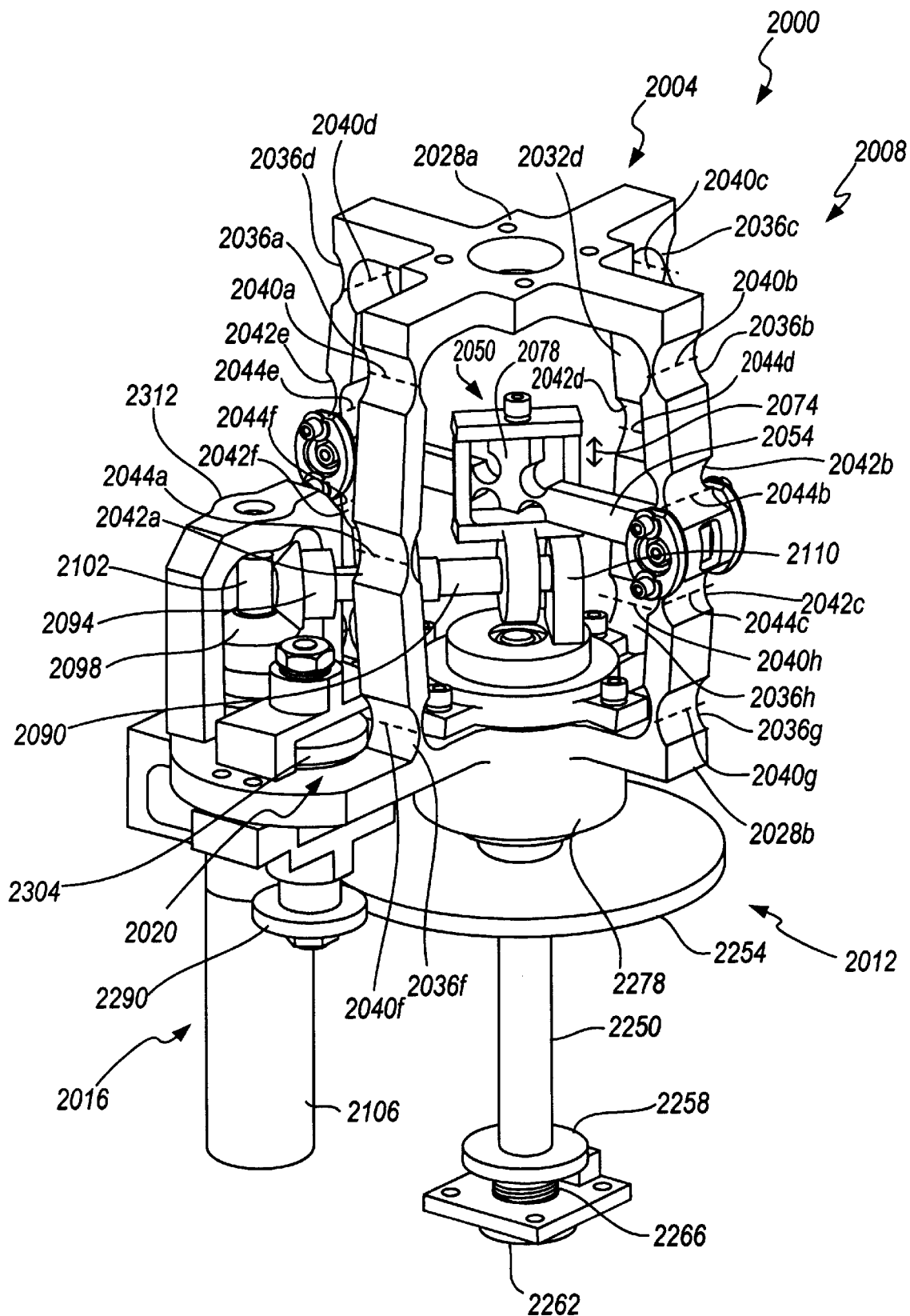
FIG. 13 is an upper perspective view of the actuator of FIG. 12.
Figure 14:
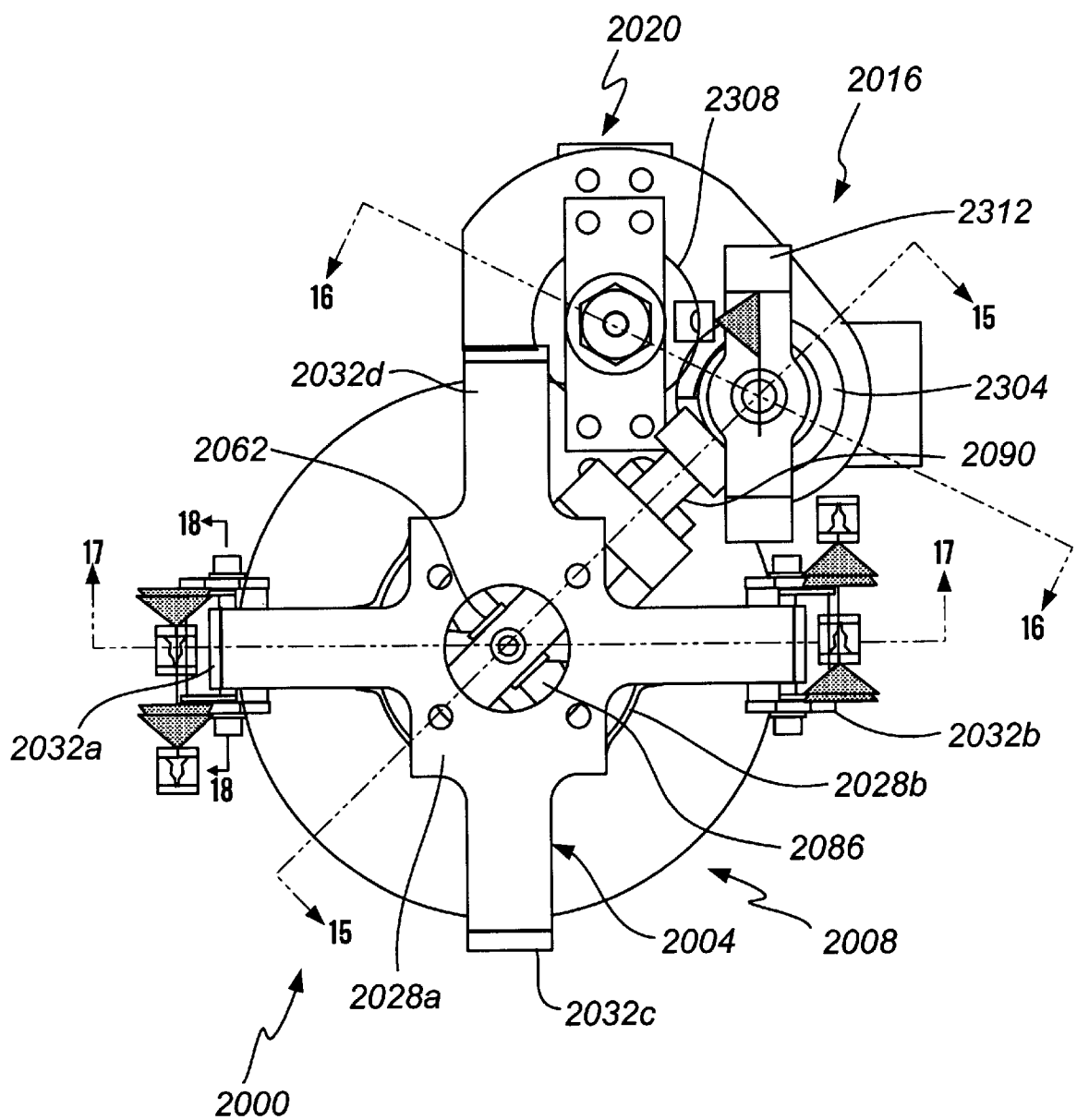
FIG. 14 is a top view of the actuator of FIG. 12.
Figure 16:
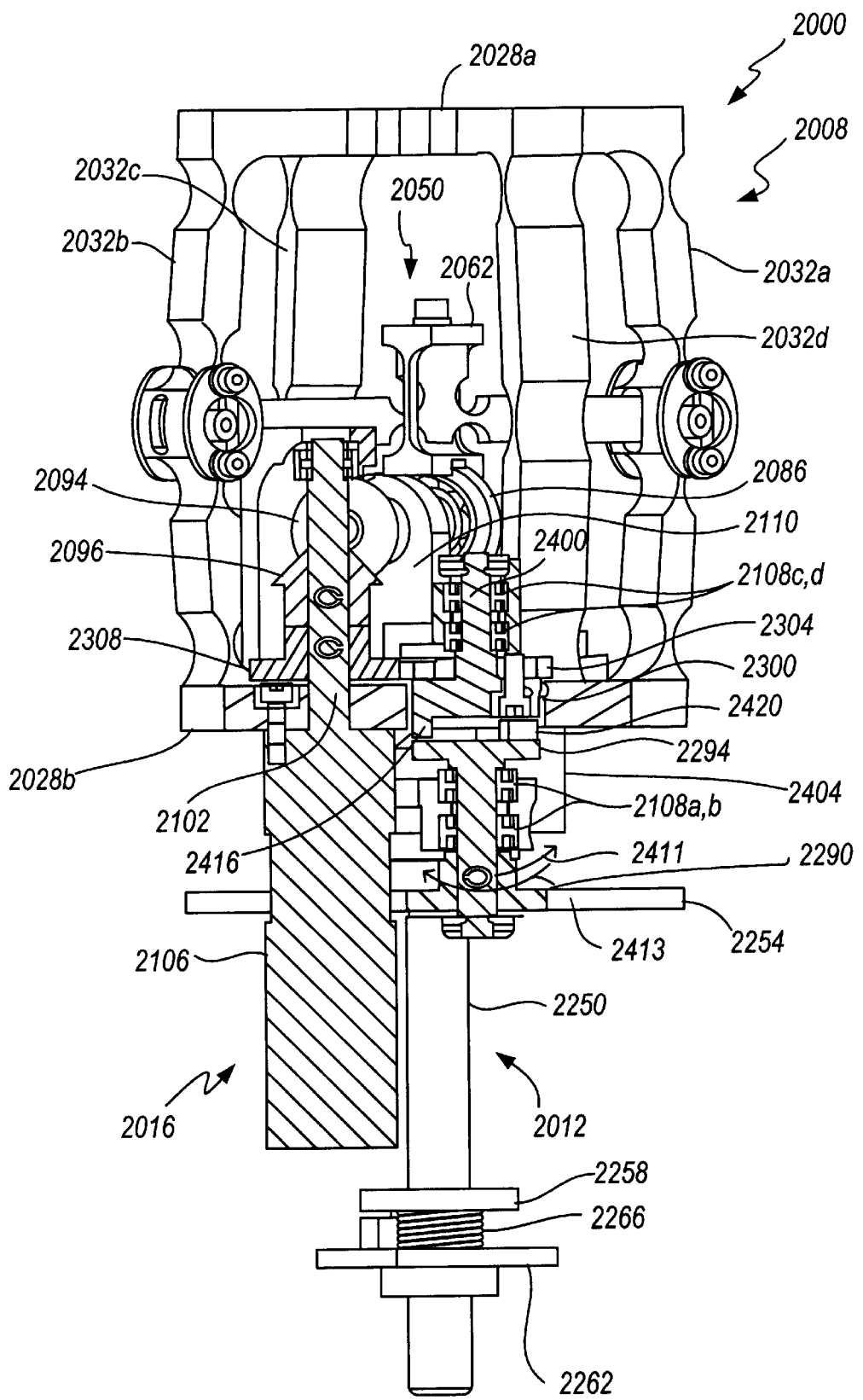
FIG. 16 is a cross-sectional view along line 16—16 of FIG. 14.

The spur gear 2254 is engaged with the motor shaft 2102 by means of a number of interlocking gears and/or couplings. Referring to FIGS. 12, 13 and 16, the spur gear 2254 rotatably engages lower spur gear 2290 which is rigidly engaged with a lower coupling 2294. The lower coupling rotatably engages the upper coupling 2300 by means of lower and upper coupling arms 2420 and 2416. The upper coupling 2300 rigidly engages an upper spur gear 2304. Upper spur gear 2304 rotatably engages spur gear 2308 which is rigidly attached to the shaft 2102 of the motor 2106. The various gears are rotatably mounted via radial bearings 2108a–d.

The Motor Assembly

The motor assembly 2016 includes a stepper motor 2106 and motor shaft 2102. The free end of the motor shaft 2102 rotatably engages the motor shaft housing 2312. The free end of the motor shaft is stabilized by a preloaded radial bearing 2316 that is mounted within the shaft housing 2312.

The Coupling Assembly

Referring to FIG. 16, the coupling assembly 2020 which selectively engages or disengages the coarse positioning system 2012 from the motor assembly 2016, includes upper and lower couplings 2300 and 2294. As can be seen from FIG. 25, the upper coupling 2300 has three counterbores 2408a–c for receiving a screw to attach the upper coupling 2300 to the upper spur gear 2304 (FIG. 28) via threaded holes 2412a–c and an upper coupling arm 2416 that extends downwardly towards the lower coupling 2294.

Figure 23:
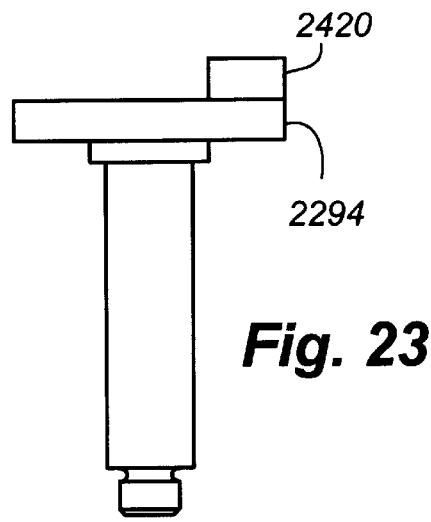
FIG. 23 is a side view of a lower coupling according to an embodiment of the present invention.
Figure 22:
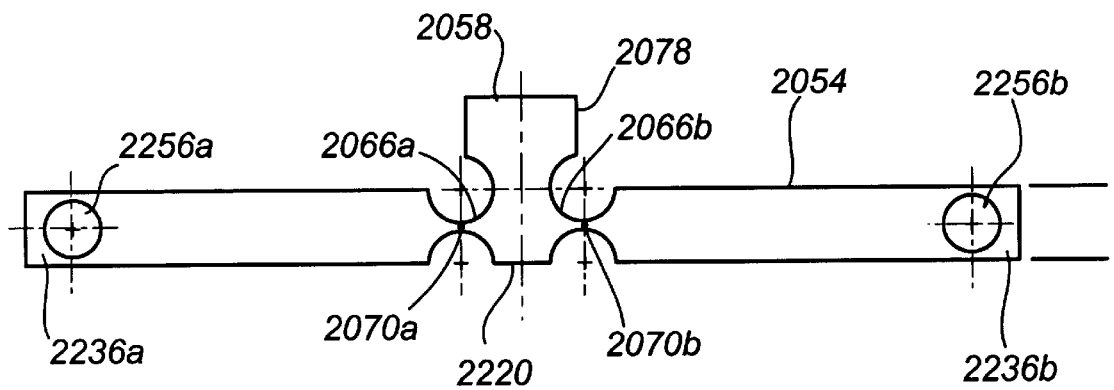
FIG. 22 is a side view of a flexure member according to an embodiment of the present invention.
Figure 24:
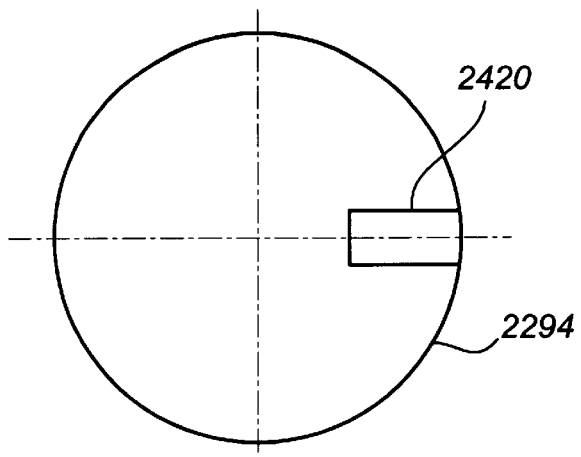
FIG. 24 is a top view of the lower coupling of FIG. 23.
Figure 25:
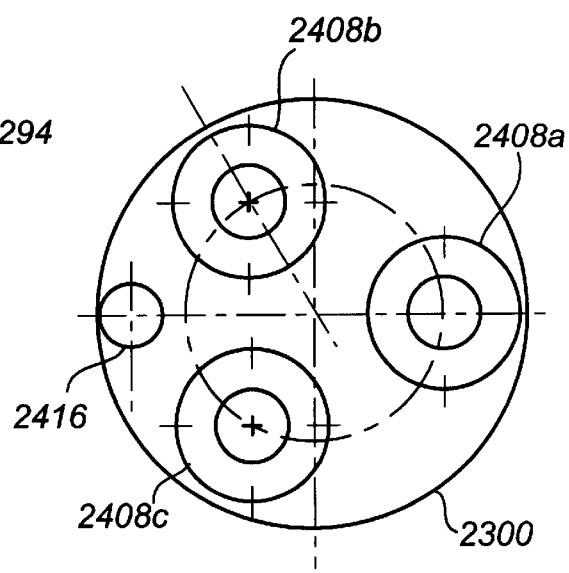
FIG. 25 is a top view of an upper coupling according to an embodiment of the present invention.
Figure 28:
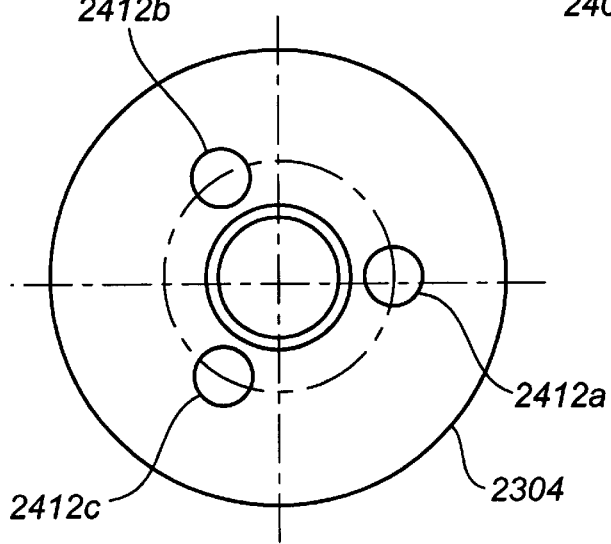
FIG. 28 is a top view of a spur gear that attaches to the upper coupling FIG. 25.
Figure 26:
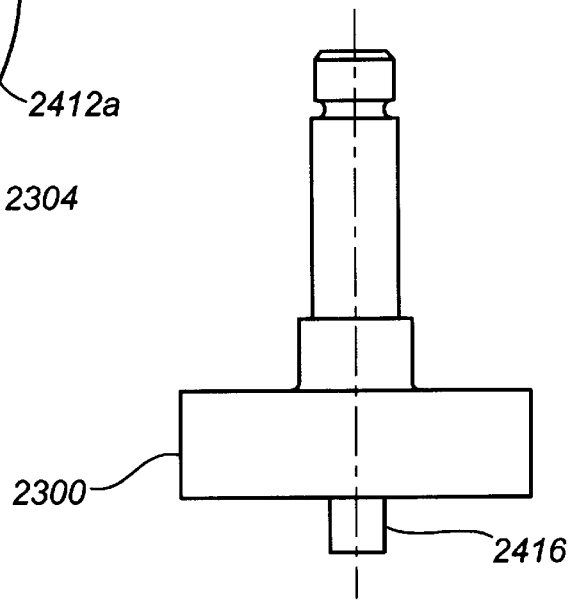
FIG. 26 is a side view of the upper coupling of FIG. 25.
Figure 27A:
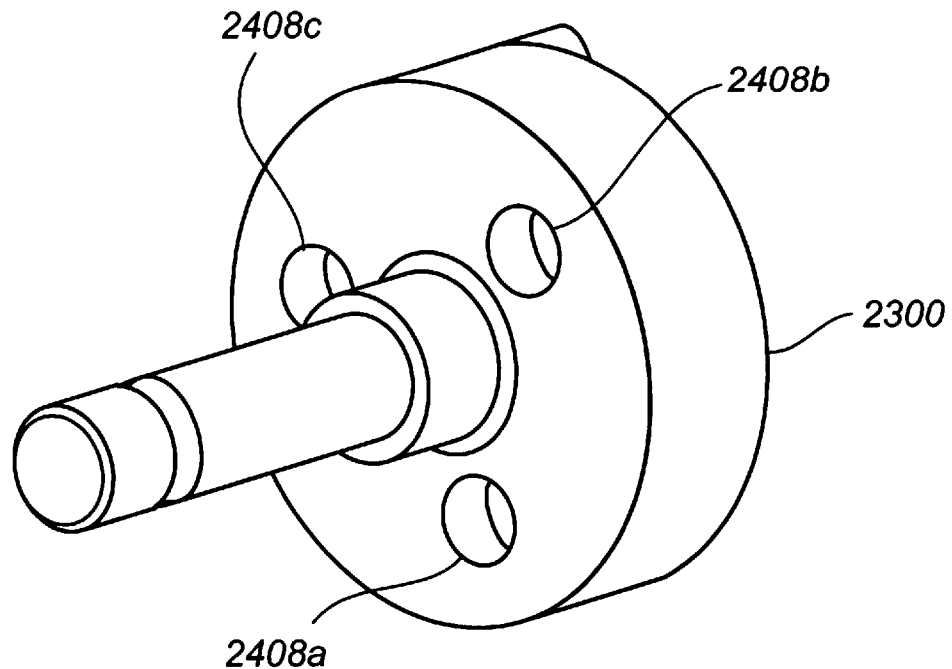
FIGS. 27A and B are rear and front perspective views, respectively, of the upper coupling of FIG. 25.
Figure 27B:
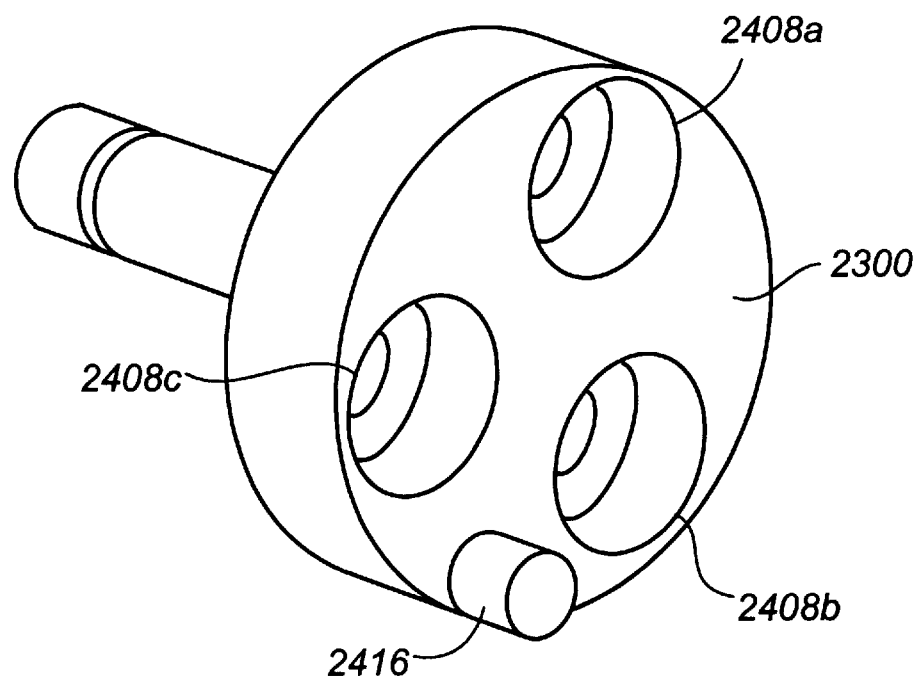

Conversely, as shown in FIGS. 23–24 the lower coupling gear 2294 includes a lower coupling arm 2420 that extends upwardly towards the upper locking gear 2300. To engage the motor shaft 2102 with the coarse positioning system 2012, the upper locking gear 2300 is rotated in a first direction 2411 until the upper coupling arm 2416 engages the lower coupling arm 2420. To disengage the motor shaft 2102 from the coarse positioning system 2012, the upper coupling arm 2416 is rotated in a second direction 2413 (that is opposite to the first direction) to disengage the upper coupling arm 2416 from the lower coupling arm 2420. Although the first direction 2411 is depicted as being counterclockwise and the second direction 2413 as being clockwise, the directions are arbitrary and can be reversed. When the coarse positioning system 2012 is disengaged from the motor shaft 2102, the fine positioning system 2008 remains engaged with the motor shaft 2102 and can be operated in isolation from the coarse positioning system 2012 for approximately one revolution of the upper spur gear 2300 to perform fine adjustments in the position of the object attached or engaged with the upper wall 2028a of the structure 2004.

The operation of the positioning device will now be described with reference to FIGS. 12–29.

To perform coarse positioning of the object upwardly, the motor shaft 2102 is first rotated counterclockwise (or clockwise) until the upper and lower coupling arms 2416 and 2420 are engaged. As the motor shaft continues to rotate counterclockwise (or clockwise), spur gear 2308 rotates upper locking spur gear 2304 in the clockwise (or counterclockwise) direction. The interlocked upper and lower coupling gears 2300 and 2294 impart the clockwise (or counterclockwise) rotation to lower spur gear 2290. Lower spur gear 2290 rotates spur gear 2254 and therefore the drive shaft 2250 in the counterclockwise (or clockwise) direction, thereby causing the shaft 2250 to move upwardly relative to the jam and drive nuts 2258 and 2262.

To perform coarse positioning of the object downwardly, the motor shaft is first rotated clockwise (or counterclockwise) until the upper and lower coupling arms 2300 and 2294 are engaged. As the motor shaft 2102 continues to rotate clockwise (or counterclockwise), the drive shaft 2250 will also be rotated in the clockwise (or counterclockwise) direction.

When the object is within a selected distance of the target position, the motor reverses the direction of rotation of the motor shaft 2102, thereby causing the upper coupling arm 2416 to move away from and disengage the lower coupling arm 2420. The fine positioning system 2008, however, continues to be engaged with the motor shaft 2102. The bevel gear 2098, which rotates in the clockwise (or counterclockwise) direction, causes bevel gear 2094 and attached cam 2082 to rotate in the counterclockwise (or clockwise) direction. The cam 2082 causes vertical (upward or downward) and horizontal (side-to-side) displacement of the ring 2086 (FIG. 19). The sidewalls 2200a,b of the cam follower 2062 deflect horizontally 2208 in response to the horizontal displacement of the ring 2686 by the cam and the top of the cam follower 2062 deflects vertically 2212 in response to the vertical displacement of the ring 2086 by the cam. The flexure member center 2078 moves vertically in response to movement of the cam follower 2062, thereby causing the distance between the intermediate flexure joints 2042a and d on the front and near and 2042b and c on one side and 2042e and f on the other side to increase or decrease and the top surface of the upper wall 2028a to be displaced vertically upward or downward. Because the cam 2082 is mounted off-center (or eccentrically) on the cam shaft 2090, rotation of the cam 2082 in one direction will produce both positive and negative vertical displacement of the flexure member 2054 and therefore of the upper wall 2028a of the flexure structure.

Figure 29:
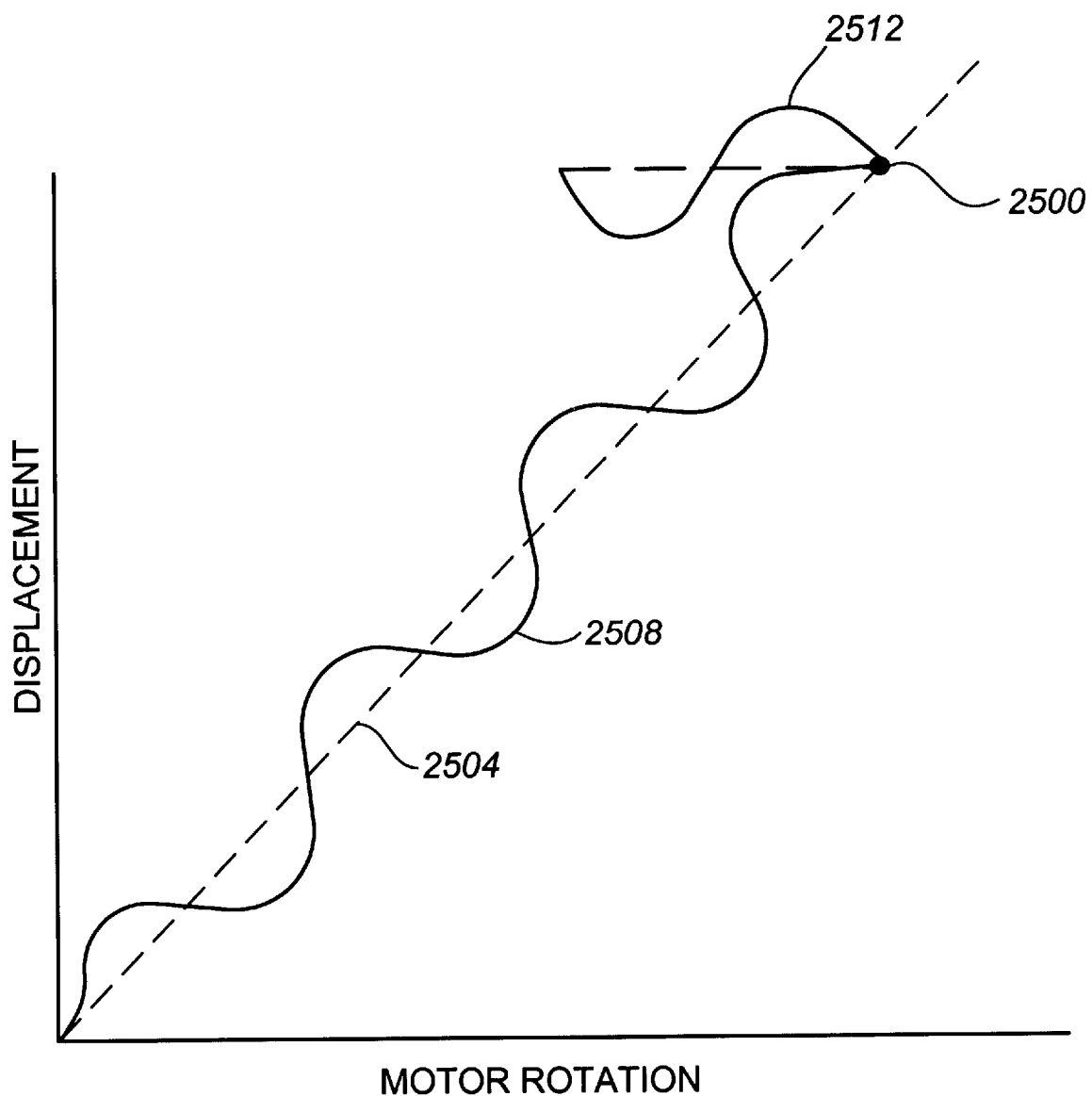
FIG. 29 is a plot of vertical displacement by the actuator (vertical axis) as a function of motor rotation (horizontal axis).

As will be appreciated, the coarse displacement of the upper wall 2028a of the structure 2004 is the sum of a linear function (which characterizes the operation of the coarse positioning system) and a periodic waveform (which characterizes the operation of the fine positioning system) because both the fine and coarse positioning systems are engaged with the motor shaft 2102. The composite function is depicted in FIG. 29, where point 2500 represents the point in time at which the coarse positioning system is disengaged from the motor shaft 2102 and the shaft 2102 is used to operate selectively the fine positioning system. The line 2504 represents the linear response of the coarse positioning system and the curve 2508 the periodic waveform characterizing the combined behavior of the coarse and fine positioning systems. The waveform 2512 represents the periodic response of the fine positioning system.

As will be appreciated, the coarse positioning system can be used to move the object upwards or downwards (or side to side) depending upon the direction of rotation of the motor shaft 2102 and the orientation of the flexure structure. To raise the object, the shaft 2102 is rotated counterclockwise (or clockwise) and to lower the object, the shaft 2102 is rotated clockwise (or counterclockwise). In the former case the upper coupling arm 2400 contacts the front side of the lower coupling arm 2420 and in the latter case the rear side of the lower coupling arm 2420.

The actuator of FIGS. 12–28 offers several advantages over existing actuators. By way of example, the actuator of the present invention can have a lower mass and weight than other mechanical actuators having similar capabilities. As will be appreciated, the reduced mass and weight is particularly important in applications, such as space vehicles, where device size and weight are critical considerations. The actuator employs a single motor to provide both fine and coarse positioning, unlike other mechanical actuators that have two motors for this purpose. The additional motor(s) increases not only the cost of the actuator and wire harness mass but also the control complexity of the positioning system. The actuator of the present invention can operate over a broad range of temperatures, including both ambient temperatures (e.g., 20° C.) as well as cryogenic temperatures. As will be appreciated, magnetorestrictive or electrorestrictive actuators typically operate only at cryogenic temperatures. Accordingly, dual actuators or swap-out of activators has been previously employed to operate at both ambient and cryogenic temperatures. The actuator of the present invention can have much higher stiffness and load capabilities than do magnetorestrictive and electrorestrictive actuators and few, if any, positioning "glitches" such as the "glitches" normally associated with such actuators. The actuator of the present invention can be used as a launch-lock device, unlike other lower strength and lower stiffness actuators. The actuator of the present invention can be significantly less expensive than other mechanical actuators due to the simple design of the actuator, the relatively few parts of the actuator, and the actuators use of relatively inexpensive components.

A number of variations and modifications of the invention can be used. For example, only two sidewalls can be used in the flexure structure as opposed to the four shown in the depicted embodiments. Alternatively, more sidewalls than four can be used, depending upon the demands of the specific application. Alternatively, multiple pieces could be joined in such a way that the resulting assembly behaves as a single, integral and/or unitary piece. The ring and cam can be located above the flexure member and the lower surface of the flexure member rigidly attached to the lower surface of the cam follower. The displacement controlling member can be any kind of device providing an eccentric or reciprocating motion such as an elliptical, elongated, irregular wheel. The upper and lower couplings can be replaced with another suitable coupling mechanism, e.g., either the upper or lower locking gear can be raised or lowered out of engagement with the other gear. Likewise, the coupling mechanism can be embodied by any of a number of intermittent gear mechanisms, including escapement, Geneva (which typically has a multiple point drive), paw and ratchet, and the like. The threaded shaft could also be replaced by a ball screw. The various gears can be any number of common gear types including bevel, spur, crown, non-circular, pinion, right angle, worm and wheel, and the like. The single thrust bearing, which allows for high tension load capability and launch lock capability, can be complemented by a second thrust bearing to allow high compression loads. The motor could be mounted directly to the cam shaft, with the fine and coarse positioning systems driven through bevel gears or another functional arrangement. Finally, the thread direction of the drive shaft can be reversed which would require counterclockwise rotation to raise the object attached or engaged with the upper wall 2028a of the flexure structure and clockwise rotation to lower the object.

Although the invention has been described by way of a preferred embodiment and certain variations and modifications, other variations and modifications can also be used in the invention being defined by the following claims.

What is claimed is:

1. In a system for making small, unidirectional adjustments in the position of an object, an actuator comprising:
   a fine positioning system for fine displacements of an object in a desired direction;
   a coarse positioning system for coarse displacements of the object in the desired direction;
   a common motor having a shaft engaging the fine and coarse positioning systems; and
   a coupling mechanism for selectively engaging and disengaging the coarse positioning system from the shaft, whereby the motor is capable of operating both the fine and coarse positioning systems, wherein the fine positioning system includes:
      a first flexure member including an upper wall, a lower wall, and left, right, front and rear sidewalls coupling said upper and lower walls, each sidewall movably coupled to said upper wall at a respective upper flexure joint defining a corresponding upper flexure axis and coupled to said lower wall at a respective lower flexure joint defining a corresponding lower flexure axis, and each sidewall having a respective intermediate flexure joint to accommodate movement of said upper wall with respect to said lower wall; and
      a linkage configured to change the distance between the respective intermediate flexure joints of said left and right sidewall in response to movement of the motor shaft.

2. The actuator of claim 1, wherein the linkage includes a second flexure member having at least one beam flexure joint defining a beam flexure axis and a displacement controlling member engaging the second flexure member, the displacement controlling member being coupled to the motor shaft and including at least one oscillatory flexure joint defining an oscillatory flexure axis, wherein the oscillatory flexure axis is offset from the beam flexure axis.

3. The actuator of claim 2, wherein the linkage includes a cam engaging the displacement controlling member and the oscillatory flexure axis permits displacement of at least a portion of the displacement controlling member in a different direction than-the direction of displacement of the flexure member.

4. The actuator of claim 3, wherein the cam includes a disk engaging a cam shaft and wherein the cam shaft is offset from the center of the cam.

5. The actuator of claim 1, wherein the coarse positioning system includes a threaded coarse positioning shaft engaging the motor shaft by means of a plurality of interlocking gears, wherein the threaded coarse positioning shaft is received in a threaded nut that is fixedly attached to a support surface.

6. The actuator of claim 1, wherein the coupling mechanism includes a pair of opposing coupling gears, each of the pair of opposing coupling gears having a coupling member configured such that, in a first mode when the coupling members are disengaged from one another, the opposing coupling gears are independently rotatable in forward and reverse directions and in a second mode when the coupling members are engaged with one another, the opposing coupling gears are not independently rotatable from one another in at least one of the forward and reverse directions.

7. A flexure structure for positioning an object, comprising:
   a first flexure member including an upper wall, a lower wall and at least two sidewalls coupling said upper and lower walls, each sidewall being movably coupled to said upper wall at a respective upper flexure joint defining a corresponding upper flexure axis and coupled to said lower wall at a respective lower flexure joint defining a corresponding lower flexure axis, and each sidewall having a respective intermediate flexure joint to accommodate movement of said upper wall with respect to said lower wall; and a linkage configured to change the distance between the intermediate flexure joints of said at least two sidewalls in response to movement of a motor shaft, wherein the linkage includes a second flexure member having at least one beam flexure joint defining a beam flexure axis and a displacement controlling member engaging the second flexure member, the displacement controlling member being coupled to the motor shaft and including at least one oscillatory flexure joint defining an oscillatory flexure axis, wherein the oscillatory flexure axis is distinct from the beam flexure axis.

8. The structure of claim 7, wherein the at least two sidewalls include left, right, front and rear sidewalls coupling said upper and lower walls.

9. The structure of claim 7, wherein the linkage includes a cam engaging the displacement controlling member and the displacement controlling member is displaced about the oscillatory flexure axis in a direction that is transverse to the direction of displacement of the second flexure member about the beam flexure axis of the second flexure member.

10. The structure of claim 7, further comprising a coarse positioning system that includes a threaded coarse positioning shaft engaging the motor shaft by means of a plurality of interlocking gears, wherein the threaded coarse positioning shaft is received in a threaded nut that is fixedly attached to a support surface.

11. The structure of claim 10, further comprising a coupling mechanism engaging the linkage and the coarse positioning system, the coupling mechanism selectively engaging and disengaging from the coarse positioning system and including a pair of opposing couplings, each of the pair of opposing couplings having a coupling arm configured such that, in a first mode when the coupling arms are disengaged from one another, the opposing couplings are independently rotatable in forward and reverse directions and in a second mode when the coupling arms are engaged with one another, the opposing couplings are not independently rotatable from one another in at least one of the forward and reverse directions.

12. The structure of claim 11, wherein the cam includes a disk engaging a cam shaft wherein the cam shaft is offset from the center of the cam.

13. A system for making small, unidirectional adjustments in the position of an object, comprising:

coarse positioning means for displacing an object to a coarse position approximating a target position;

coupling means for disengaging the coarse positioning means from a shaft;

fine positioning means, that is different from the coarse positioning means, for displacing the object to the target position; and a common motor engaging the shaft which engages each of the coarse positioning means, coupling means, and fine positioning means, wherein the fine position means includes:

a flexure structure including upper and lower walls and at least two sidewalls coupling the upper and lower walls, each sidewall being movably coupled to the upper wall at a flexure joint defining upper flexure axes and coupled to the lower wall at a flexure joint defining lower flexure axes, and each sidewall having an intermediate flexure joint to accommodate movement of the upper wall with respect to the lower wall; and a linkage configured to change the distance between the intermediate flexure joints of the at least two sidewalls in response to movement of the shaft.

14. The device of claim 13, wherein the linkage includes a flexure member having a flexure joint and engaging the at least two sidewalls at or near the intermediate flexure joints and a displacement controlling member.

15. The device of claim 14, wherein the linkage includes:

means for oscillating the displacement controlling member in first and second directions, wherein the first and second directions are transverse to one another, wherein the displacement controlling member includes means for displacing at least a portion of the flexure member about the flexure member's flexure joint in the first direction and means for dampening the movement of at least a portion of the flexure member in the second direction.

* * * * *